US011482067B2

(12) United States Patent
Forutanpour et al.

(10) Patent No.: US 11,482,067 B2
(45) Date of Patent: Oct. 25, 2022

(54) KIOSK FOR EVALUATING AND PURCHASING USED ELECTRONIC DEVICES

(71) Applicant: ecoATM, LLC, San Diego, CA (US)

(72) Inventors: Babak Forutanpour, San Diego, CA (US); Jeffrey Ploetner, San Diego, CA (US); Robert O'Neil, San Diego, CA (US); Neil Vesco, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 376 days.

(21) Appl. No.: 16/788,169

(22) Filed: Feb. 11, 2020

(65) Prior Publication Data

US 2020/0258343 A1  Aug. 13, 2020

Related U.S. Application Data

(60) Provisional application No. 62/807,153, filed on Feb. 18, 2019, provisional application No. 62/804,714, filed on Feb. 12, 2019.

(51) Int. Cl.
*G06T 7/73* (2017.01)
*G07F 17/00* (2006.01)
(Continued)

(52) U.S. Cl.
CPC ..... *G07F 17/0014* (2013.01); *G06Q 30/0278* (2013.01); *G06T 7/0004* (2013.01); *H04N 5/2253* (2013.01); *G06T 2207/30108* (2013.01)

(58) Field of Classification Search
CPC ..... G06Q 99/00; G06F 3/0488; G06F 9/5044; G06F 15/0208; G06F 3/0362; G06F 3/017; G07F 7/06; G07F 11/63; G07F 19/201
(Continued)

(56) References Cited

U.S. PATENT DOCUMENTS 3,808,439 A   4/1974 Renius
4,248,334 A   2/1981 Hanley et al.
(Continued)

FOREIGN PATENT DOCUMENTS

CA   2760863       11/2010
CA   2818533 A1   5/2012
(Continued)

OTHER PUBLICATIONS

U.S. Appl. No. 16/952,340, filed Nov. 20, 2020, Unpublished.
(Continued)

*Primary Examiner* — Phuoc H Doan
(74) *Attorney, Agent, or Firm* — Perkins Coie LLP

(57) ABSTRACT

Consumer operated kiosks for recycling electronic devices are disclosed herein. In some embodiments, the kiosk includes a rotatable inspection plate configured to receive an electronic device when the inspection plate is in a first position. The kiosk can include a camera having a field of view including at least a portion of the inspection plate. The kiosk can include a wired and/or wireless connectivity device configured to connect to the electronic device and one or more processors configured to: receive characteristic information about the electronic device via the wired and/or wireless connectivity device; cause the inspection plate to rotate to a second position; receive one or more images of the electronic device via the camera when the inspection plate is in the second position; and facilitate determination of an offer price for the electronic device based at least in part on the characteristic information and the one or more images.

11 Claims, 32 Drawing Sheets

(51) Int. Cl.
  *G06Q 30/02* (2012.01)
  *G06T 7/00* (2017.01)
  *H04N 5/225* (2006.01)
(58) Field of Classification Search
  USPC .................................................. 382/103, 232
  See application file for complete search history.

(56) References Cited

U.S. PATENT DOCUMENTS

| | | |
|---|---|---|
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,407,392 B2 | 8/2008 | Cooke et al. |
| 7,408,674 B2 | 8/2008 | Moro et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,743,215 B1 | 11/2014 | Lee |
| 8,922,643 B2 | 12/2014 | Ji et al. |
| 9,010,627 B1 | 4/2015 | Prasad et al. |
| 9,043,026 B2 | 5/2015 | Lien et al. |
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,317,989 B2 | 4/2016 | Grow et al. |
| 9,355,515 B2 | 5/2016 | Brahami et al. |
| 9,367,982 B2 | 6/2016 | Chayun et al. |
| 9,378,606 B2 | 6/2016 | Chayun et al. |
| 9,390,442 B2 | 7/2016 | Lyle |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,697,548 B1 | 7/2017 | Jaff et al. |
| 9,704,142 B2 | 7/2017 | Ahn |
| 9,818,160 B2 | 11/2017 | Bowles et al. |
| 9,866,664 B2 | 1/2018 | Sinha et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |

(56) References Cited

U.S. PATENT DOCUMENTS

| | | |
|---|---|---|
| 9,934,644 B2 | 4/2018 | Chayun et al. |
| 10,032,140 B2 | 7/2018 | Bowles et al. |
| 10,043,339 B2 | 8/2018 | Walker et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,269,110 B2 | 4/2019 | Forutanpour et al. |
| 10,275,813 B2 | 4/2019 | Fu |
| 10,325,440 B2 | 6/2019 | Abdelmalak et al. |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,475,002 B2 | 11/2019 | Silva et al. |
| 10,496,963 B2 | 12/2019 | Silva et al. |
| 10,572,946 B2 | 2/2020 | Bowles et al. |
| 10,657,591 B1 | 5/2020 | Chen et al. |
| 10,679,279 B2 | 6/2020 | Ward |
| 10,824,942 B1 | 11/2020 | Bhotika et al. |
| 10,825,082 B2 | 11/2020 | Librizzi et al. |
| 10,846,672 B2 | 11/2020 | Dion et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 11,010,841 B2 | 5/2021 | Bowles et al. |
| 11,024,111 B2 | 6/2021 | Abdelmalak et al. |
| 11,080,662 B2 | 8/2021 | Bowles et al. |
| 11,080,672 B2 | 8/2021 | Bowles |
| 11,107,046 B2 | 8/2021 | Bowles |
| 11,126,973 B2 | 9/2021 | Silva et al. |
| 11,232,412 B2 | 1/2022 | Hunt et al. |
| 11,315,093 B2 | 4/2022 | Bowles |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0186744 A1 | 9/2004 | Lux |
| 2004/0189812 A1 | 9/2004 | Gustaysson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2007/0012665 A1 | 1/2007 | Nelson |
| 2007/0013124 A1 | 1/2007 | Graef et al. |
| 2007/0032098 A1 | 2/2007 | Bowles et al. |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Rolton et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051090 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |

(56) References Cited

U.S. PATENT DOCUMENTS

| | | |
|---|---|---|
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0035322 A1 | 2/2011 | Lively |
| 2011/0043628 A1 | 2/2011 | Yun |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0235812 A1 | 9/2012 | De Mello et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0157641 A1 | 6/2013 | Brahami et al. |
| 2013/0159119 A1 | 6/2013 | Henderson et al. |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0038556 A1 | 2/2014 | DeSousa |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0170237 A1 | 6/2015 | Powell |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0309912 A1 | 10/2015 | Nguyen et al. |
| 2015/0320485 A1 | 11/2015 | Nash |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0087381 A1 | 3/2016 | Wong et al. |
| 2016/0092849 A1 | 3/2016 | Cirannek et al. |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0210648 A1 | 7/2016 | Cirannek et al. |
| 2016/0269401 A1 | 9/2016 | Saito et al. |
| 2016/0275460 A1 | 9/2016 | Ploetner et al. |
| 2016/0275518 A1 | 9/2016 | Bowles et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0115235 A1 | 4/2017 | Ohlsson et al. |
| 2017/0169401 A1 | 6/2017 | Beane et al. |
| 2017/0256119 A1 | 9/2017 | Abdelmalak et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2017/0372273 A1 | 12/2017 | Bowles et al. |
| 2018/0084094 A1 | 3/2018 | Sinha et al. |
| 2018/0157820 A1 | 6/2018 | Adams et al. |
| 2018/0260794 A1 | 9/2018 | Bowles et al. |
| 2018/0293566 A1 | 10/2018 | Engles et al. |
| 2018/0321163 A1 | 11/2018 | Casadio |
| 2018/0322623 A1 | 11/2018 | Memo et al. |
| 2019/0019147 A1 | 1/2019 | McCarty et al. |
| 2019/0066439 A1 | 2/2019 | Pinkus |
| 2019/0166278 A1 | 5/2019 | Hiyama et al. |
| 2019/0222748 A1* | 7/2019 | Weir .................. H04N 13/117 |
| 2019/0251777 A1 | 8/2019 | Abdelmalak et al. |
| 2019/0279431 A1 | 9/2019 | Wurmfeld et al. |
| 2019/0287141 A1 | 9/2019 | Bordeleau et al. |
| 2019/0318465 A1 | 10/2019 | Nguyen |
| 2020/0020097 A1 | 1/2020 | Do et al. |
| 2020/0090137 A1 | 3/2020 | Bowles et al. |
| 2020/0151677 A1 | 5/2020 | Bowles et al. |
| 2020/0167748 A1 | 5/2020 | Dion et al. |
| 2020/0175669 A1 | 6/2020 | Bian et al. |
| 2020/0202319 A1 | 6/2020 | Forutanpour et al. |
| 2020/0241891 A1 | 7/2020 | Li et al. |
| 2020/0259300 A1 | 8/2020 | Forutanpour et al. |
| 2020/0265487 A1 | 8/2020 | Forutanpour et al. |
| 2020/0393742 A1 | 12/2020 | Dion et al. |
| 2021/0012315 A1 | 1/2021 | Priebatsch |
| 2021/0035206 A1 | 2/2021 | Bowles et al. |
| 2021/0081914 A1 | 3/2021 | Nelms et al. |
| 2021/0110440 A1 | 4/2021 | Dion et al. |
| 2021/0174312 A1 | 6/2021 | Bowles et al. |
| 2021/0192484 A1 | 6/2021 | Forutanpour et al. |
| 2021/0254966 A1 | 8/2021 | Hur et al. |

(56) References Cited

U.S. PATENT DOCUMENTS

| | | |
|---|---|---|
| 2021/0295494 A1 | 9/2021 | Forutanpour et al. |
| 2022/0027879 A1 | 1/2022 | Bowles et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0172178 A1 | 6/2022 | Forutanpour et al. |
| 2022/0198407 A1 | 6/2022 | Beane et al. |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 202351953 | 7/2012 |
| CN | 202394296 | 8/2012 |
| CN | 102654927 | 9/2012 |
| CN | 102682597 A | 9/2012 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 205132514 U | 4/2016 |
| CN | 106372638 A | 2/2017 |
| CN | 206440635 U | 8/2017 |
| CN | 206466691 U | 9/2017 |
| CN | 207037788 U | 2/2018 |
| CN | 105444678 B | 3/2018 |
| CN | 108596658 A | 9/2018 |
| CN | 108764236 A | 11/2018 |
| CN | 208819255 U | 5/2019 |
| CN | 208819289 U | 5/2019 |
| CN | 208819290 U | 5/2019 |
| CN | 208969761 U | 6/2019 |
| CN | 111009073 A | 4/2020 |
| CN | 210666955 U | 6/2020 |
| CN | 211149556 U | 7/2020 |
| CN | 111099242 B | 9/2021 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| HK | 30014296 A | 8/2020 |
| JP | 7112801 | 5/1995 |
| JP | H7334583 | 12/1995 |
| JP | H11242005 | 9/1999 |
| JP | 2000121564 | 4/2000 |
| JP | 2000171409 A | 6/2000 |
| JP | 2000180371 | 6/2000 |
| JP | 3123095 | 1/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2017093938 | 6/2017 |
| JP | 2019012474 | 1/2019 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101329949 | 11/2013 |
| KR | 20140037543 | 3/2014 |
| KR | 1020180086617 | 8/2018 |
| KR | 20190026131 | 3/2019 |
| KR | 1020190107594 | 9/2019 |
| KR | 1020200115308 | 10/2020 |
| KR | 20210020717 | 2/2021 |
| KR | 1020210059148 | 5/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | WO2005101346 | 10/2005 |
| WO | WO2006058601 | 6/2006 |
| WO | WO2006080851 | 8/2006 |
| WO | WO2007066166 | 6/2007 |

(56) References Cited

FOREIGN PATENT DOCUMENTS

| | | |
|---|---|---|
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019212513 | 11/2019 |
| WO | WO2019212515 | 11/2019 |
| WO | WO2020082991 | 4/2020 |
| WO | WO2020204503 | 10/2020 |
| WO | WO2021019286 | 2/2021 |
| WO | WO2021082923 | 5/2021 |
| WO | WO2021142009 | 7/2021 |
| WO | WO2021147385 | 7/2021 |
| WO | WO2021147386 | 7/2021 |
| WO | WO2021147387 | 7/2021 |

OTHER PUBLICATIONS

2006 Florida Statutes Title XXXIII, Chapter 538, Sections 538.03 and 538.04, 7 pages.
3GPP Organizational Partners, "3rd Generation Partnership Project; Technical Specification Group Terminals; AT command set for GSM Mobile Equipment (ME)," Global System for Mobile Communications, 1998, 124 pages.
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.
Altec Lansing User's Guide 2007, 8 pages.
Bhule et al., "Environmental and economic trade-offs in consumer electronic products recycling: a case study of cell phones and computers," IEEE International Symposium on Electronics and the Environment, Conference Record, 2004.
Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Business Wire, "The World's First Office Photography Machine" at CES 2008 Launched by Ortery Technologies, Jan. 7, 2008, 3 pages.
CNET, "Tackling LCD "burn ins", and dead/stick Pixels", published Sep. 2, 2009, retrieved from http://www.cnet.com/news/tackling-lcd-burn-ins-and-deadstuck-pixels/.
Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008, 1 page.
Cybercom Group, "Leading Telecom Organisations Address Device Management Issues," Press Release, 2007, 1 page.

Evgenii Masunov, Mar. 25, 2010, http://www.appleinsider.ru/news/ipone-obladaet-luchshim-tachskrinom-provereno_robotom.html, 4 pages.
Foster et al., "Automated Visual Inspection: A Tutorial" 1990 Computers Ind. Engng. vol. 18(4): 493-504.
Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=lcd on Apr. 28, 2016, 1 page.
International Numbering Plan, www.numberingplans.com, 2 pages.
International Search Report and Written Opinion dated Jun. 3, 2020 in International Application No. PCT/US2020/017766, 10 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route to Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Shue, Jiuh-Biing et al. "Extended consumer responsibility: Syncretic value-oriented pricing strategies for trade-in-for-upgrade pro-

(56) References Cited

OTHER PUBLICATIONS grams" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications AB, "P800/P802," White Paper, 2003, 128 pages.
Sony Ericsson Mobile Communications AB, "T68i/T68ie," White Paper, 2002, 71 pages.
Tecace Software: "Your phone appraisal—Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology (2009).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.

\* cited by examiner

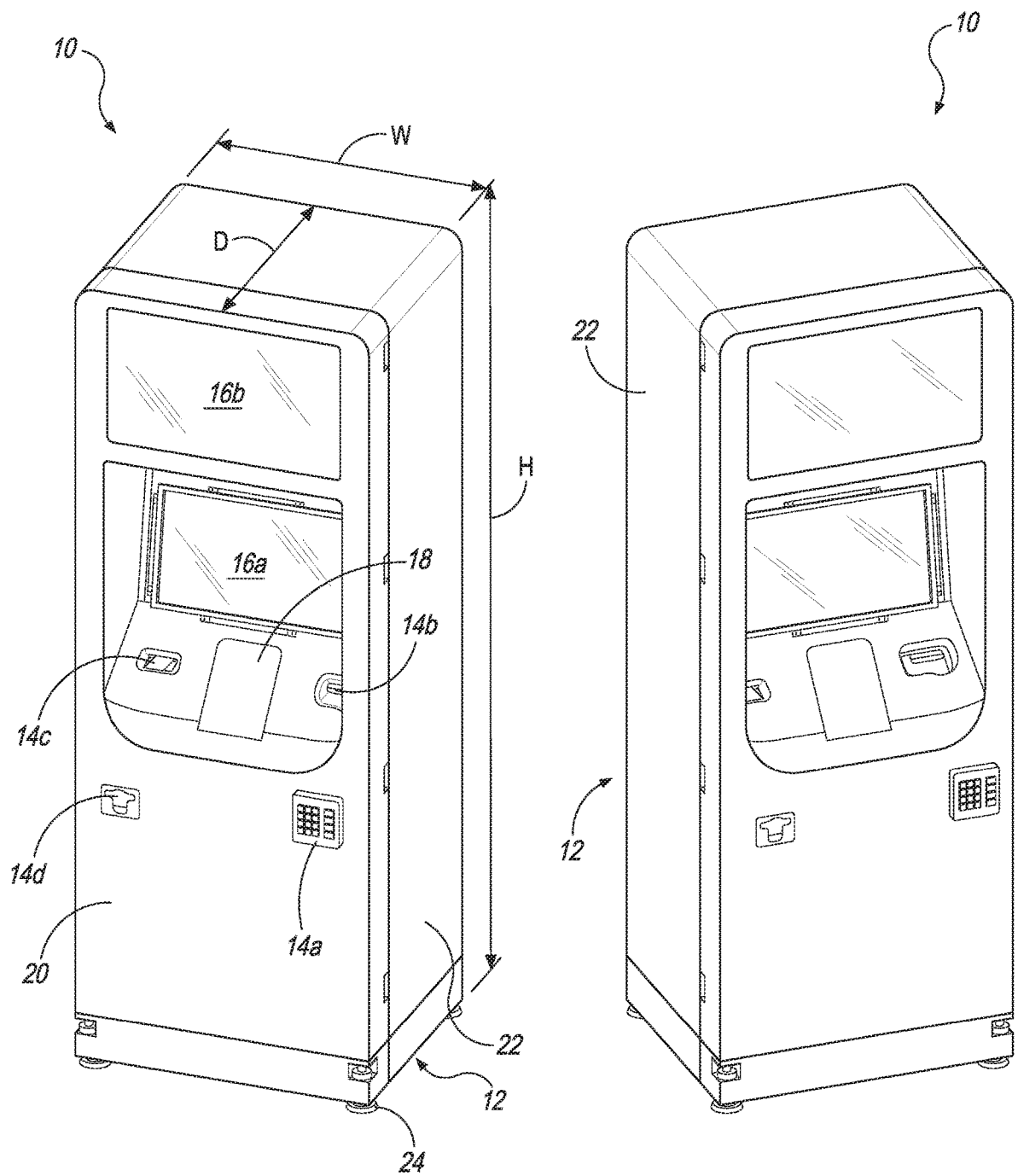

US 11,482,067 B2

KIOSK FOR EVALUATING AND PURCHASING USED ELECTRONIC DEVICES

CROSS-REFERENCE TO RELATED APPLICATIONS

The present application claims priority to and the benefit of U.S. Provisional Application No. 62/807,153, titled KIOSK FOR EVALUATING AND PURCHASING USED ELECTRONIC DEVICES, which was filed on Feb. 18, 2019, and to U.S. Provisional Application No. 62/804,714, titled CONNECTOR CARRIER FOR ELECTRONIC DEVICE KIOSK, which was filed on Feb. 12, 2019, each of which is incorporated herein by reference in its entirety and made part of the present disclosure.

TECHNICAL FIELD

The present disclosure is generally related to consumer operated kiosks for buying mobile phones and other electronic devices from users.

BACKGROUND

There are more mobile phones in use now than there are people on the planet. The rapid growth of mobile phones is due in part on the rapid pace at which these devices evolve. Because of the rapid pace of development, a relatively high percentage of mobile phones are replaced every year as consumers continually upgrade to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones are simply tossed into junk drawers or otherwise kept until a suitable disposal solution arises.

Although many mobile phone retailers and cell carrier stores now offer mobile phone trade-in or buyback programs, many old phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can recycle and/or sell their used mobile phones using self-service kiosks located in malls, retail stores, or other publicly accessible areas. Such kiosks are operated by ecoATM, LLC, the assignee of the present application, and aspects of these kiosks are described in, for example: U.S. Pat. Nos. 7,881,965, 8,195,511, 8,200,533, 8,239,262, 8,423,404 and 8,463,646; U.S. Provisional Patent Application Nos. 62/169,072, 62/202,330, 62/332,736 62/782,302 and 62/782,947; and U.S. patent application Ser. Nos. 14/498,763, 14/500,739, 14/506,449, 14/568,051, 14/598,469, 14/660,768, 14/663,331, 14/873,145, 14/873,158, 14/925,357, 14/925,375, 14/934,134, 14/964,963, 14/967,183, 14/966,346, 15/057,707, 15/130,851, 15/176,975 and 16/719,699, each of which is incorporated herein by reference in its entirety.

BRIEF DESCRIPTION OF THE DRAWINGS

FIG. 1 is front, top, right isometric view of an electronic device recycling kiosk configured in accordance with embodiments of the present technology.

FIG. 2 is a front, top, left isometric view of the kiosk of FIG. 1.

DETAILED DESCRIPTION

Figure 3:
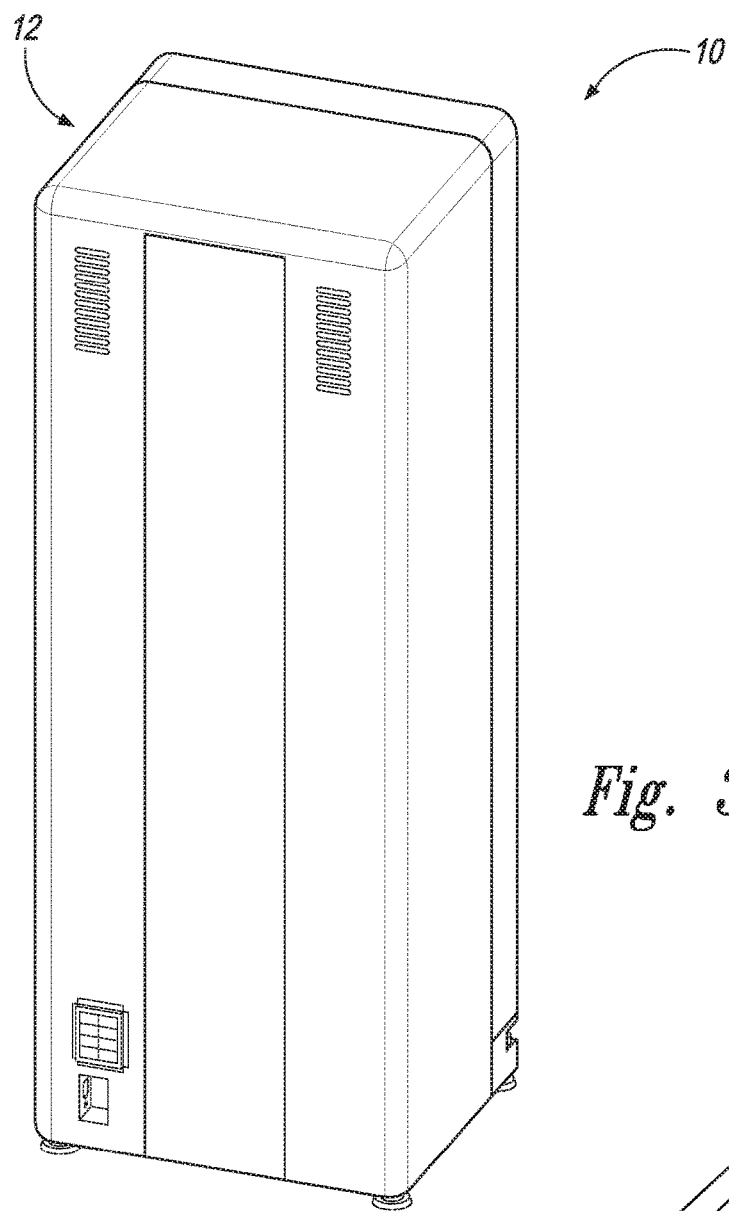
FIG. 3 is a back, top, left isometric view of the kiosk of FIG. 1.

The following disclosure describes various embodiments of consumer operated kiosks for recycling mobile phones and other electronic devices. In some embodiments, the kiosks are sized and shaped to fit relatively small installation sites (e.g., urban retailers, airports, transportation stations, or other space-sensitive settings). The kiosks can include a housing configured to accommodate one or more displays, user interfaces, testing apparatuses, bins, device evaluation systems (DESs), and/or other kiosk components. In some embodiments, DESs configured in accordance with the present technology can include moveable and/or tiltable testing equipment configured to transition between two or more positions. For example, the DES can include a test platform, a connector assembly, and one or more upper and/or lower cameras and light assemblies, all or some of which can be configured to transition between a home position (e.g., a position in which the user interacts with the kiosk), a grading position (e.g., a position in which the kiosk/DES is configured to evaluate the condition of the phone or other electronic device to be purchased), and a binning position (e.g., a position in which the electronic device is transitioned into a bin or other holding unit after completion of the transaction with the user) by tilting one or more components of the DES about an axis of rotation. These features can allow for a reduction in the volume of the kiosk necessary to evaluate the electronic device to be purchased and/or recycled. In some embodiments, upper and/or lower domes of the testing equipment are gray in color, in contrast to conventional domes that are white. The gray coloring of the dome(s) can reduce glare on the tested electronic device and can allow for improved device identification and/or damage detection. In certain applications, the domes can include black (or otherwise dark-colored) portions on the interior surfaces thereof to absorb excess light and further reduce glare. As a result of these and/or other features and improvements, kiosks configured according to the present technology are able to evaluate electronic devices while occupying a relatively small footprint in a retail or other setting.

Certain details are set forth in the following description and in FIGS. 1-23 to provide a thorough understanding of various embodiments of the present technology. In other instances, well-known structures, materials, operations and/or systems often associated with mobile electronic devices, mobile device recycling kiosks, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below. In the Figures, identical reference numbers identify identical, or at least generally similar, elements.

Figure 4:
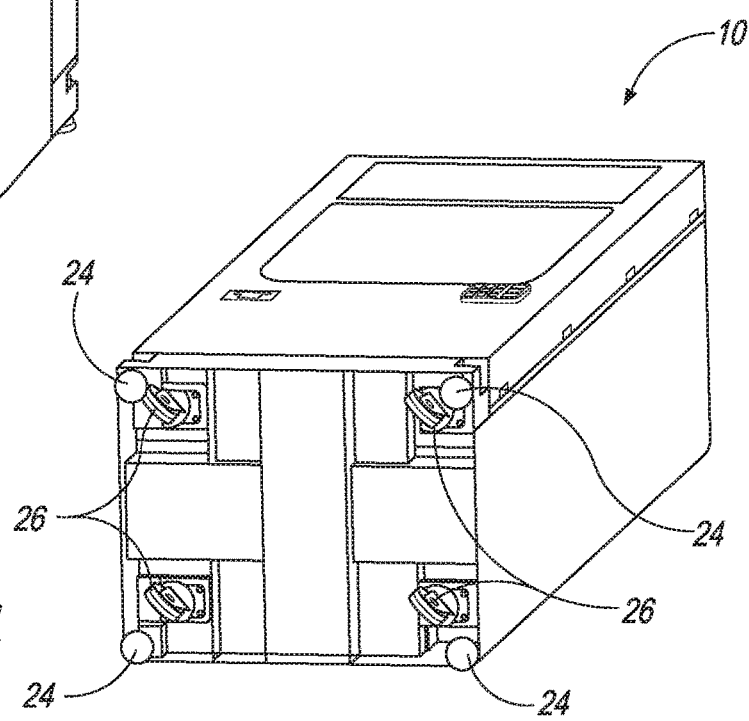
FIG. 4 is a bottom, front, right isometric view of the kiosk of FIG. 1.

FIGS. 1 and 2 are front isometric views of a kiosk 10 configured in accordance with embodiments of the present technology for purchasing electronic devices (e.g., mobile phones, tablets, etc.) from a user. FIG. 3 is a rear isometric view of the kiosk 10, and FIG. 4 is a bottom isometric view of the kiosk 10. Referring to FIGS. 1-4 collectively, the kiosk 10 can include a housing 12 and one or more user interface devices 14a-d configured to facilitate use of the kiosk 10. The user interface devices 14a-d can include a keypad 14a, an ID card reader 14b, a payment dispenser 14c, a receipt dispenser 14d, and/or other user interface devices (e.g., a thumbprint scanner) to facilitate the electronic device purchase process. As illustrated, the kiosk 10 can also include one or more displays 16a-b. The one or more displays 16a-b can include touch-screen capability for receiving user inputs in response to displayed prompts, etc. The kiosk 10 can also include an access door 18 which can retract to permit the user to submit their electronic device (not shown) for evaluation. The access door 18 can cover an aperture in a front door 20 of the kiosk 10. One or more of the user inputs 14a-d can be positioned on or in the front door 20 of the kiosk 10. In some embodiments, one or more of the user interfaces 14a-d can be positioned on or in a side wall 22 of the kiosk housing 12.

Referring to FIG. 1, the housing 12 can have a height H, a width W, and a depth D. In some embodiments, the height H is between 24-90 inches, between 30-90 inches, between 36-72 inches, and/or between 48-84 inches. In some embodiments, the width W is between 10-54 inches, between 12-48 inches, between 24-36 inches, and/or between 20-30 inches. In some embodiments, the depth D is between 15-30 inches and/or between 18-24 inches.

As illustrated in FIG. 4, the kiosk 10 can include one or more feet 24 and/or one or more casters 26. The feet 24 can be configured to adjust in height to allow for levelling of the kiosk 10 at non-level installation locations. In some embodiments, the feet 24 can be retracted upward and above the casters 26 to allow the kiosk 10 to be easily moved on the casters. In some embodiments, the casters 26 are adjustable and capable of moving downward to contact a floor or other surface upon which the kiosk 10 is installed.

Figure 5:
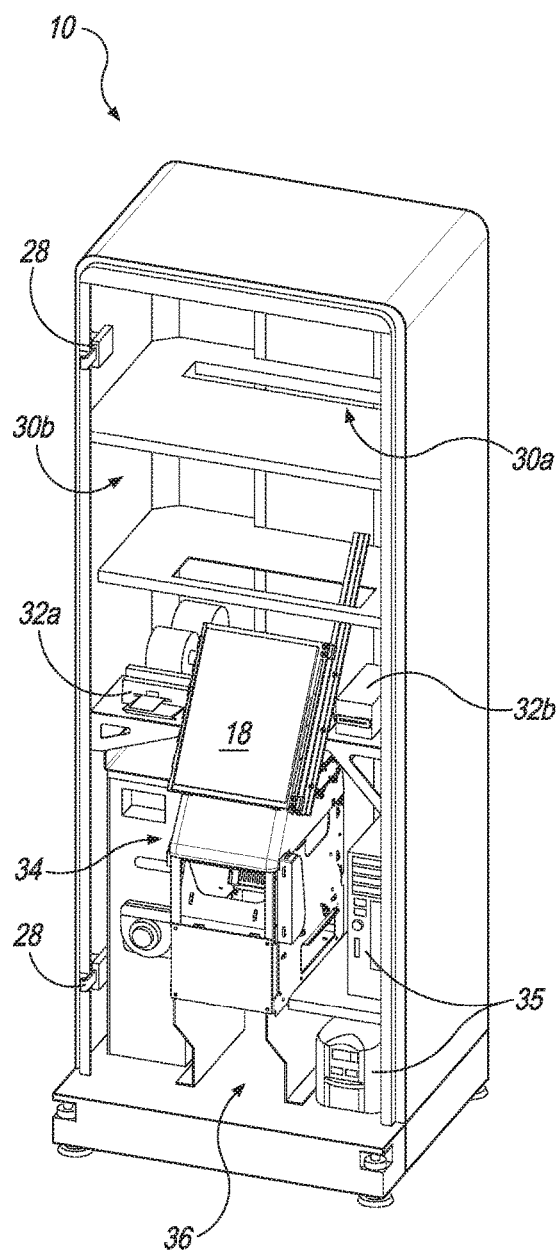
FIG. 5 is a front, top, right isometric view of the kiosk of FIG. 1 with a front door and associated hardware omitted for purposes of better illustrating internal components and systems of the kiosk.

FIG. 5 is an isometric view of the kiosk 10 with the front door 20 (FIG. 1) removed to illustrate internal components of the kiosk 10. The front door 20 can be configured such that it pivots (e.g., about one or more hinges) between opened and closed positions while one or both of the displays 16a-b remain stationary. Maintaining one or more of the displays 16a-b in the position illustrated in FIGS. 1-2 can allow a technician or other operator to perform maintenance and/or repair to internal components of the kiosk 10 while observing instructions on one or more of the displays 16. In some embodiments, one of the displays 16 (e.g., the upper display 16b) is connected to and moves with the front door 20 while the other display (e.g., the lower display 16a) remains in place.

The kiosk 10 can include one or more compartments 30a-b configured to accommodate the displays 16a-b. These display compartment(s) 30a-b can be positioned at or near an upper end of the kiosk 10. One or more dispensers 32a-b (e.g., receipt printers/dispensers, label printers/dispensers, cash/voucher or other remuneration dispensers, etc.) can be positioned in appropriate locations and compartments within the kiosk 10 to dispense associated receipts, labels, cash, etc. to users as needed to perform the methods described herein. CPUs and other computer hardware 35 can be positioned in a lower portion of the kiosk 10 and can be operably connected, via cables (e.g., extendable cables) and/or via wireless connectors to other components within and/or outside of the kiosk 10. In some embodiments, the kiosk 10 includes one or more power cables configured to plug into a wall outlet or other facility power source. In some embodiments, one or more energy storage units (e.g., batteries) can be positioned in the kiosk 10 to power the components described above. The DES 34 can be positioned at or near a lower portion of the kiosk 10 above a bin slot 36 configured to accommodate a bin or other storage receptacle for receiving purchased and/or recycled electronic device.

Figure 6:
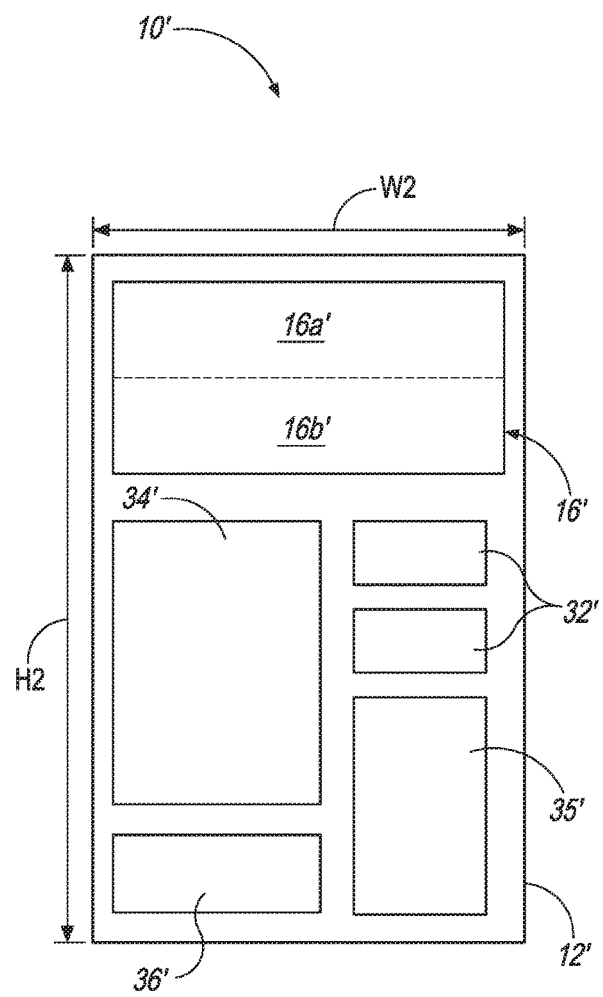
FIG. 6 is a front schematic view of an electronic device recycling kiosk configured in accordance with embodiments of the present technology.

In some embodiments, the DES 34 can be positioned at or near the center of the kiosk 10. In other embodiments, the DES 34 can be positioned in other portions of the kiosk 10, for example. FIG. 6 illustrates a front schematic view of a kiosk 10' wherein a DES 34' can be positioned at or near one of the sidewalls of a housing 12' of the kiosk 10'. Remaining hardware 35' and user interfaces 32' can be positioned in the space above, below, and/or to the side of the DES 34'. In some configurations, positioning the DES 34' toward one side of the kiosk 10' can further reduce the overall dimensions of the kiosk 10', as the user interfaces 32' and other hardware components 35' can be positioned in a compact, localized arrangement. In some embodiments, the kiosk 10' includes a single display 16'. The single display can include touch screen capabilities and/or can display advertisements/instructions. In some embodiments, the kiosk 10' includes two displays 16a', 16b' similar in function and/or structure to the displays 16a, 16b, respectively, described above.

Figure 7A:
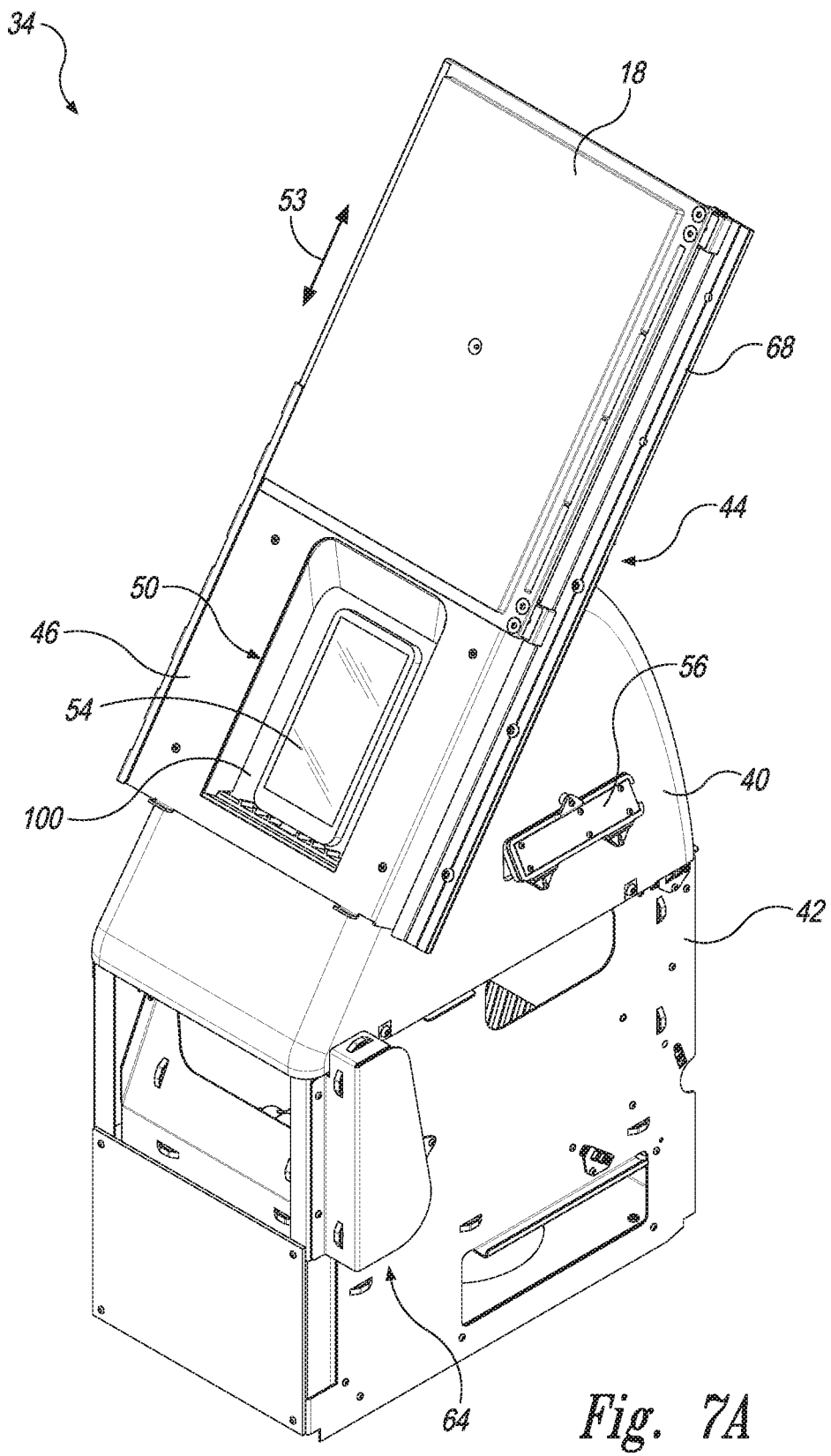
FIG. 7A is a front, top, right isometric view of an electronic device evaluation system (DES) of the electronic device recycling kiosk of FIGS. 1-5 configured in accordance with embodiments of the present technology.

FIG. 7A is an enlarged front isometric view of the DES 34 removed from the kiosk 10 to better illustrate the components of the DES 34. As illustrated, the DES 34 can include an upper housing 40 and a lower housing 42. In some embodiments, the upper and lower housings 40, 42 are integrally formed with each other. In other embodiments, the upper and lower housings 40, 42 are separate parts. In some embodiments, the kiosk includes an access door assembly 44. The access door assembly 44 can be connected to the upper DES housing 40. In some embodiments, the access door assembly 44 includes a lower frame 46 mounted to the upper DES housing 40. The access door frame 46 can include an opening 48 configured to provide access to an inspection area 50 of the kiosk 10. As described in more detail below, the access door assembly 44 can include an access door 18 configured to move (e.g., slide) between a closed position and an open position (as shown in FIG. 7A) along a movement direction 53. In the closed position, the access door 18 blocks access to the electronic device inspection area 50 of the DES 34. In the open positioned, the access door 18 is moved away from the inspection area 50 as shown in FIG. 7A to allow for insertion and/or removal of an electronic device 54 into/from the inspection area 50.

Figure 7B:
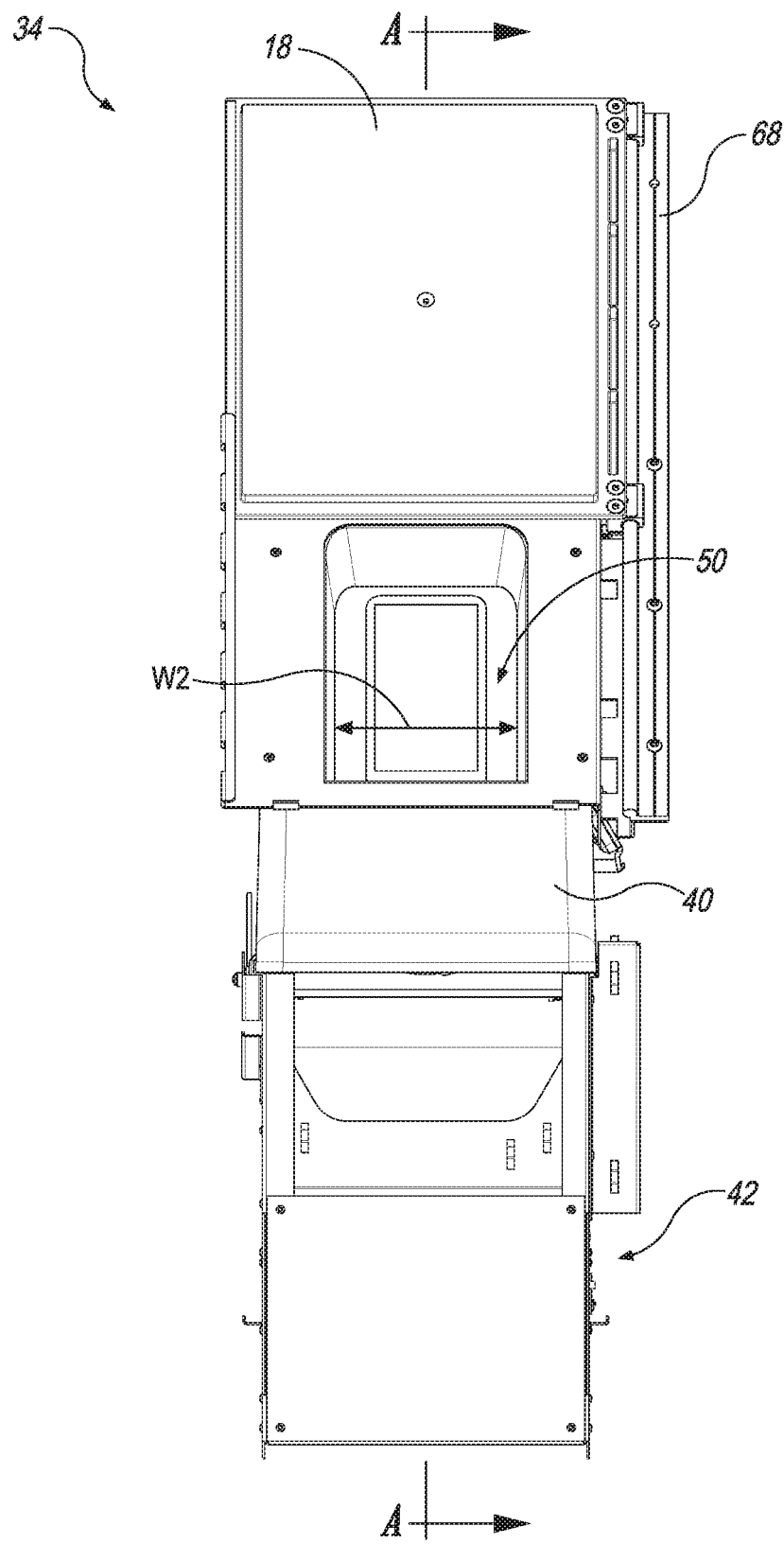
FIG. 7B is a front view of the DES of FIG. 7A.
Figure 7C:
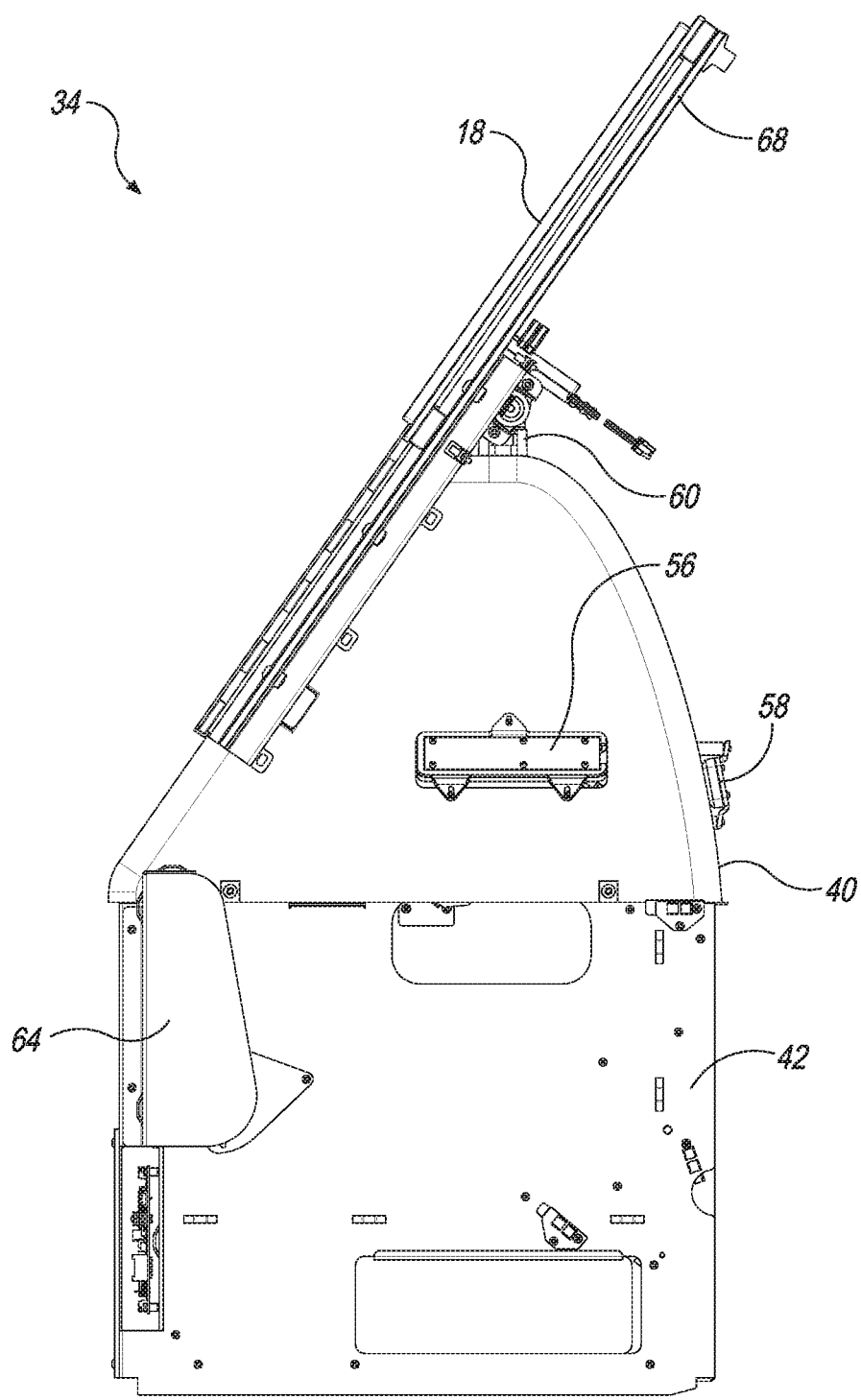
FIG. 7C is a right side view of the DES of FIG. 7A.

FIG. 7B is a front view of the DES 34 and FIG. 7C is a right side view thereof. As illustrated in FIG. 7B, the inspection area 50 can have a width W2 (e.g., as measured parallel to the floor on which the kiosk 10 is installed) sufficient to receive a mobile phone or other electronic device 54. For example, the width W2 of the inspection area can be at least 4 inches, at least 6 inches, at least 8 inches, and/or at least 12 inches. In some embodiments, the width W2 of the inspection area 50 is between 4-10 inches, between 6-12 inches, between 8-20 inches, and/or between 10-14 inches. Preferably, the width W2 of the inspection area 50 is approximately 18 inches. As shown in FIG. 7C, the upper housing 40 can have a dome-shape, a partial dome shape, or an otherwise bulbous shape. The shape of the upper housing 40 can facilitate use of the upper housing 40 as an upper dome for visual inspection of the electronic device 54, as described in more detail below. The upper DES housing 40 can include one or more inwardly-directed light assemblies mounted therein or thereon. For example, an upper side light assembly 56 can be mounted through a sidewall of the upper housing 40 and an upper rear light assembly 58 can be mounted through a rear wall of the upper housing 40 and directed into the upper DES housing 40. In the illustrated embodiment, each of the light assemblies 56, 58 includes the same number of lights (e.g., three lights). In some embodiments, the side light assembly 56 can include a different number of lights than the rear light assembly 58. For example, due to the shape of most electronic devices being longer than they are wide, the side light assembly 56 may include more lights than the rear light assembly 58 to better illuminate the full length of the electronic device. In some embodiments, an upper camera 60 (FIG. 7C) is mounted on or in an upper portion of the upper DES housing 40 (e.g., at or near an upper end of the upper DES housing 40).

Figure 7D:
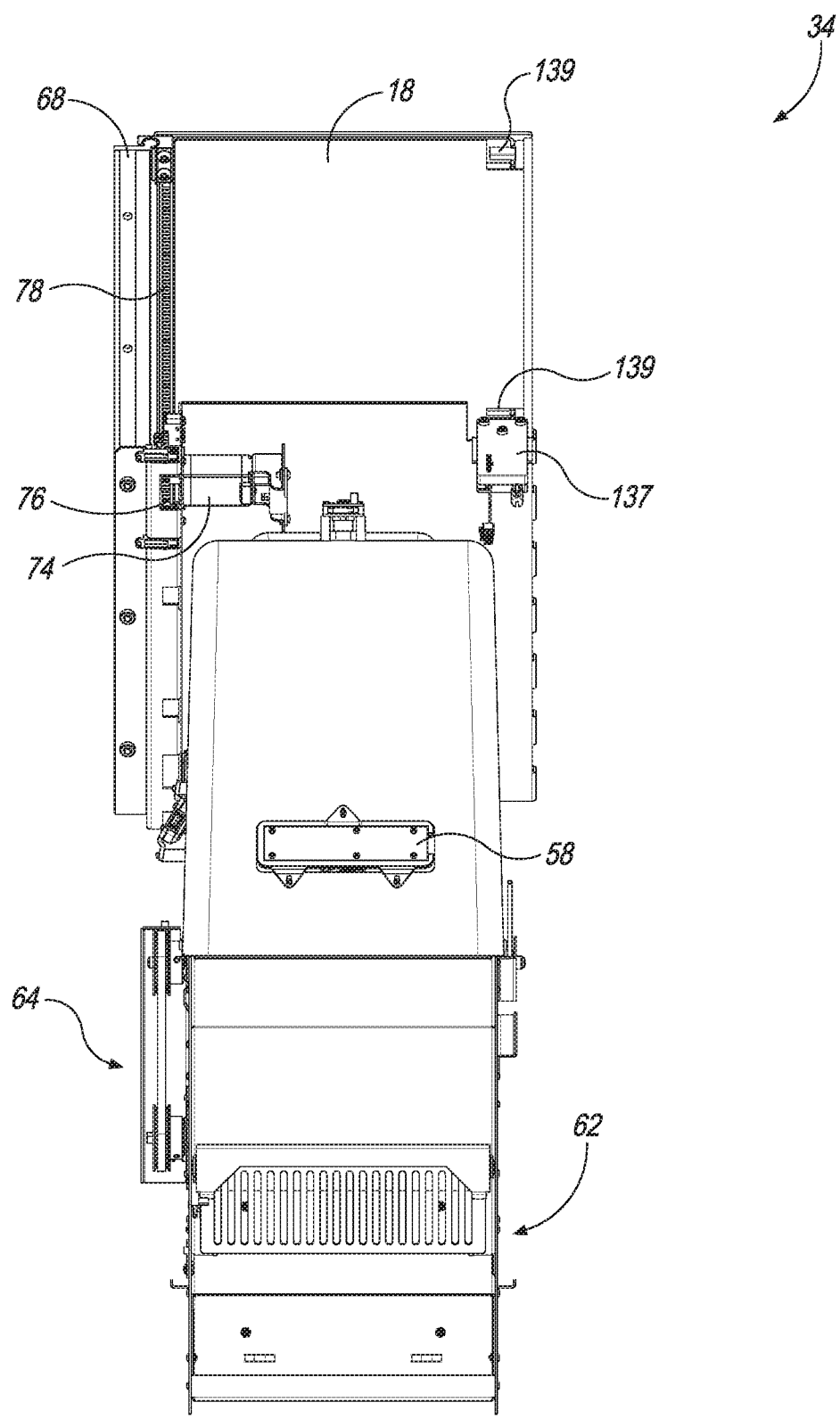
FIG. 7D is a back view of the DES of FIG. 7A.

FIG. 7D is a rear elevation view of the DES 34. As illustrated, the lower DES housing 42 can include a chute 62 or other structure through which the electronic device, as described in detail below, can be configured to fall after inspection of the device and acceptance of a purchase offer by the user. In some embodiments, a drive assembly 64, configured to facilitate tilting of the inspection area 50 and other components, as described in more detail below, is mounted on a side of the lower DES housing 42. The access door assembly 44 can include a locking mechanism 137 configured to selectively engage with one or more lock interfaces 139 on the access door 18 (e.g., on a back surface of the access door 18). For example, the lock interfaces 139 can be indentations on the back surface of the access door configured to receive a movable protrusion or other portion of the locking mechanism 137. Engaging the lock interfaces 139 with the locking mechanism 137 can inhibit or prevent the access door from moving between the opened and closed configurations without selective disengagement of the movable protrusion of the locking mechanism 137 from the lock interfaces 139.

Figure 7E:
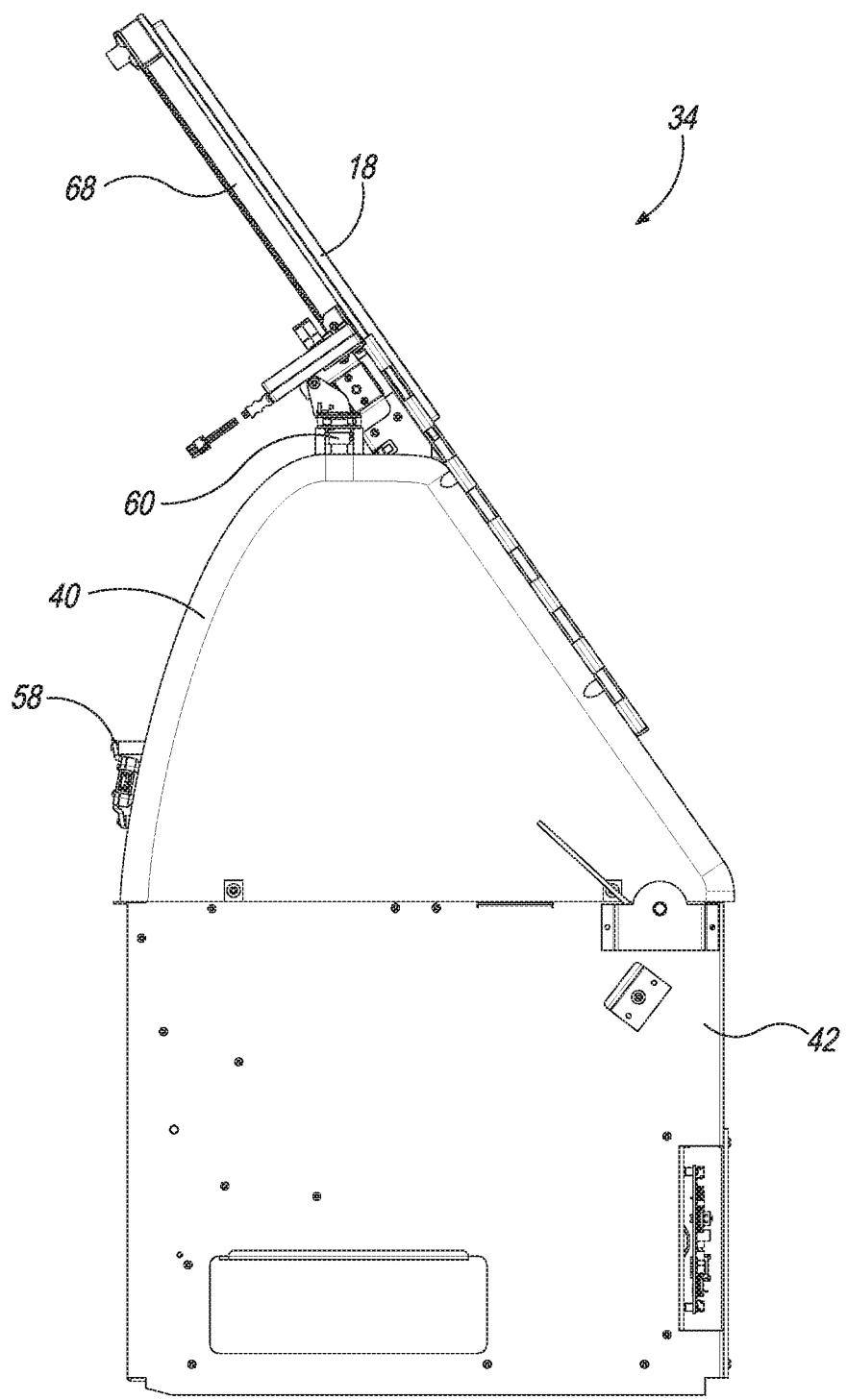
FIG. 7E is a left side view of the DES of FIG. 7A.
Figure 7F:
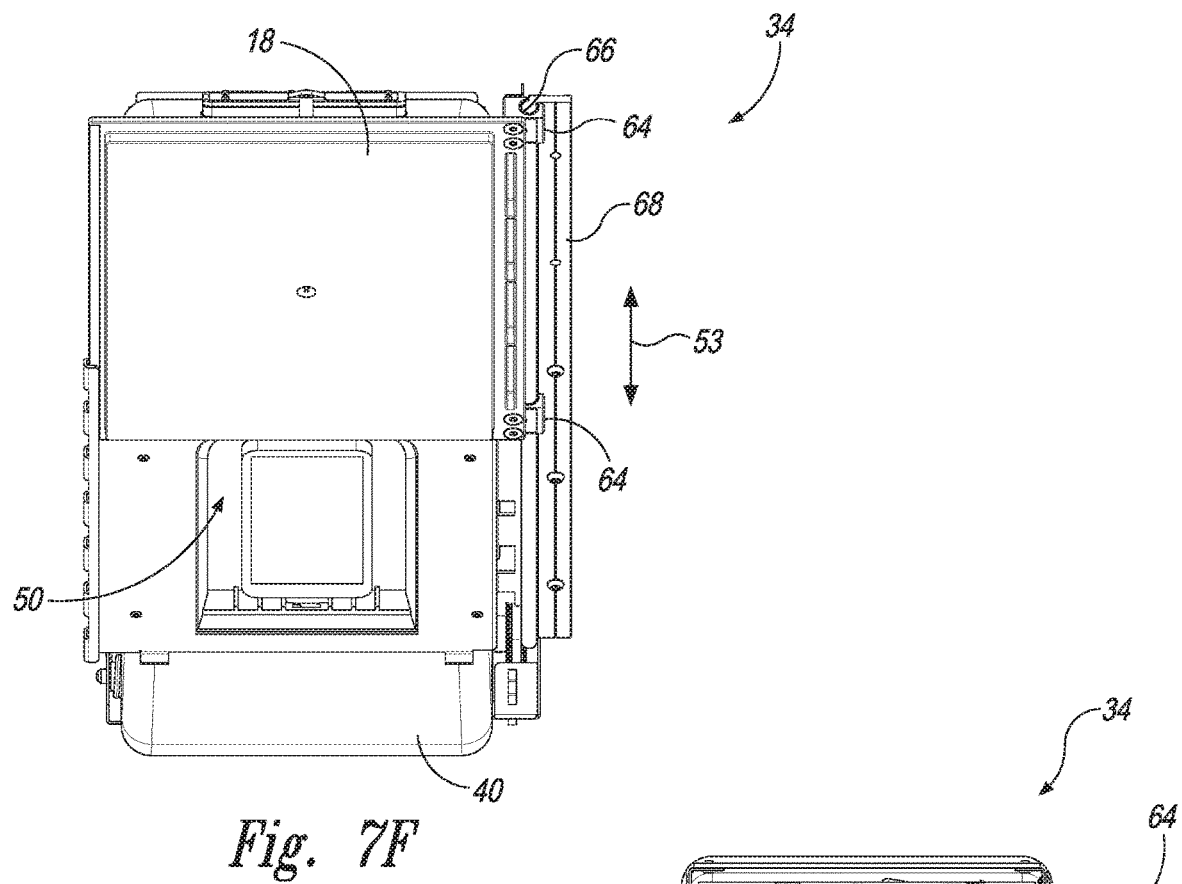
FIG. 7F is a top plan view of the DES of FIG. 7A.
Figure 7G:
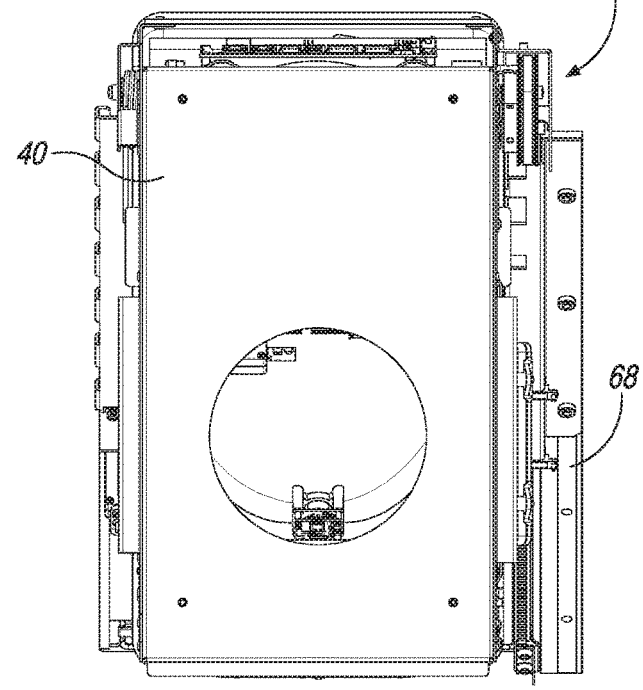
FIG. 7G is a bottom plan view of the DES of FIG. 7A.

FIGS. 7E, 7F, and 7G are a left side view, a top view, and a bottom view, respectively, of the DES 34. As illustrated in FIG. 7F, the access door 18 can include one or more guides 64 configured to engage (e.g., slidably engage) a rail 66 on a track 68. In some embodiments, the track 68 and/or rail 66 (e.g., a round rail) are mounted or otherwise attached to the access door frame 46. Engagement between the guides 64 and the rail 66 can facilitate movement of the access door 18 along the movement path 53 in two parallel and opposite directions (e.g., parallel to the length of the rail 68) while limiting movement of the access door 18 in other directions.

Figure 8:
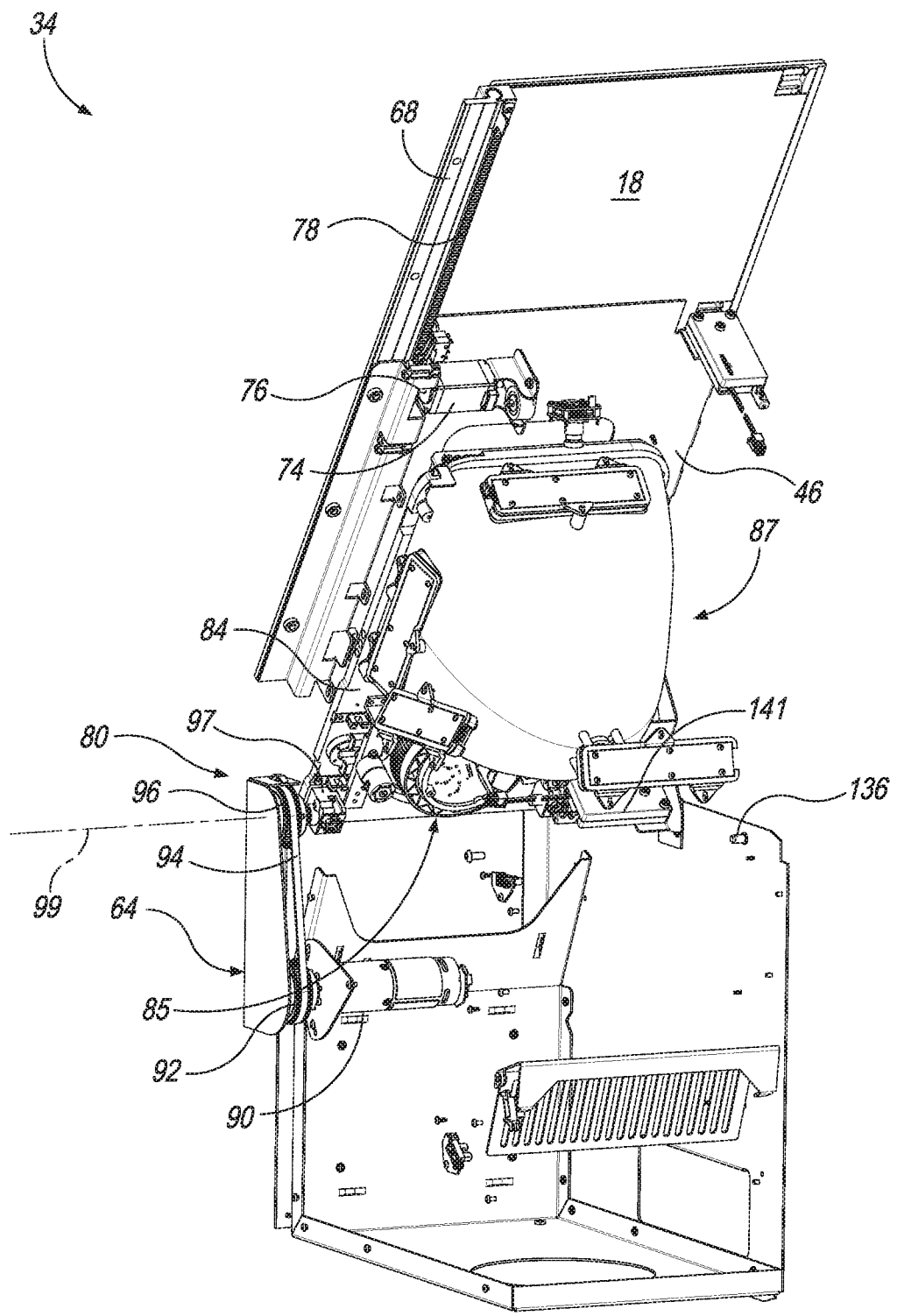
FIG. 8 is a back, top, right isometric view of the DES of FIG. 7A with portions of the lower housing removed for purposes of illustration.
Figure 11A:
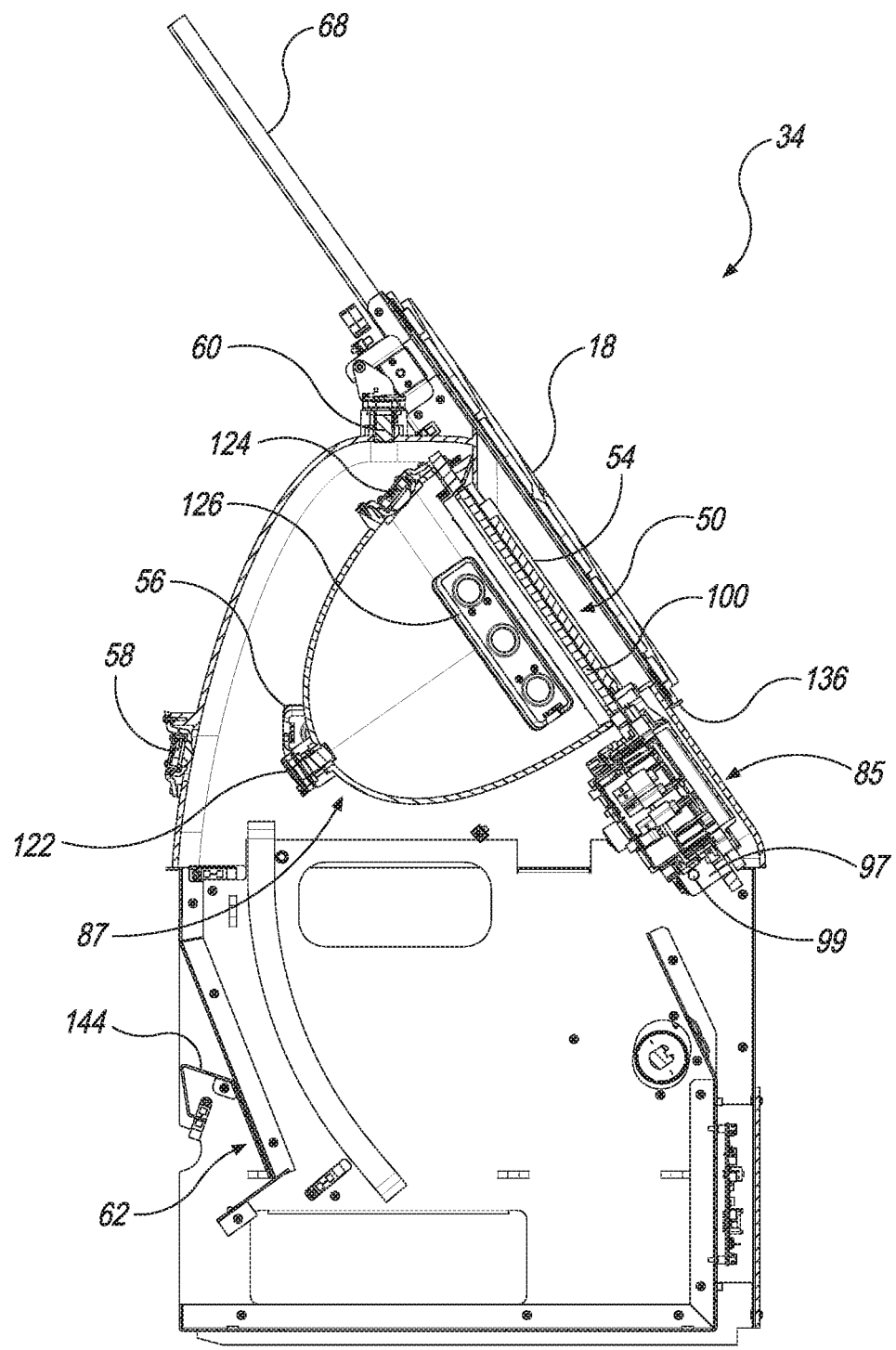
FIG. 11A is a cross-sectional side view of the DES of FIG. 7A taken along cut-plane A-A of FIG. 7B, in which the tilting assembly is in the home position and the access door is closed.

FIG. 8 is a rear isometric view of the DES 34 with the upper DES housing 40 and right and rear sidewalls of the lower DES housing 42 removed for purposes of illustration. The DES 34 can include an access door motor 74 (e.g., a step motor) configured to move the access door 18 between the opened position (FIG. 7A) and the closed position (FIG. 11A). For example, the access door motor 74 can be configured to rotate a sprocket 76 having teeth sized and shaped to interface with a toothed track 78 on the back side of the access door 18. Rotation of the sprocket moves 76 the access door 18 between the opened and closed positions. In some embodiments, the access door motor 74, the guides 66, and/or the track 70 include a dampening mechanism to inhibit or prevent damaging impacts between the access door 18 and other components of the kiosk if power is cutoff from the kiosk and the access door 18 moves toward the closed position.

As illustrated in FIG. 8, The DES 34 can include a moveable evaluation subassembly ("MES") 80. The MES 80 can include the drive assembly 64 configured to tilt/rotate one or more components of the DES 34 about a horizontal axis of rotation between two or more positions. The MES 80 can include a base plate 84 that is operably coupled to the drive assembly 64. The base plate 84 can be hingedly (e.g., rotatably) connected to the lower DES housing 42, to the upper DES housing 40, or to some other portion of the kiosk 10. Additional components can be mounted to the base plate 84, as explained in more detail below. For example, a connector carrier 85 (e.g., a primary connector carrier and/or rotatable connector carrier) can be rotatably mounted to the base plate 84 and configured to move with the base plate 84. As described in greater detail below, the connector carrier 85 can include multiple individual electrical connectors circumferentially distributed on a rotatable hub (e.g., a carrousel). In some embodiments, a lower dome assembly 87 is mounted to the base plate 84 and/or otherwise configured to move with the base plate 84.

Figure 9:
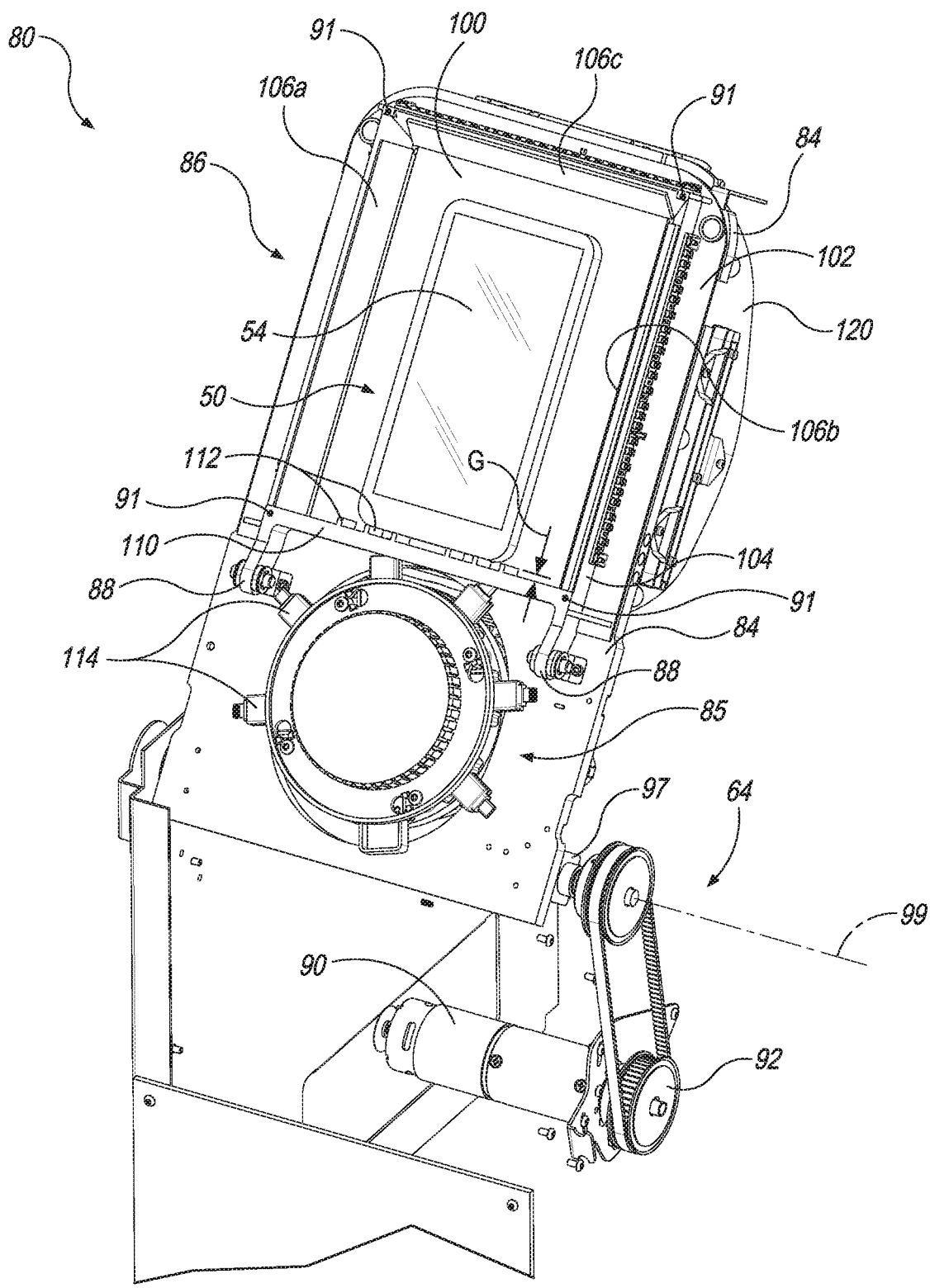
FIG. 9 is a front, top, right isometric view of the DES of FIG. 7A with the upper and lower housings removed for purposes of illustration.

FIG. 9 is an isometric view of the MES 80 with the upper DES housing 40 and lower DES housing 42 removed for purposes of illustration. The MES 80 can further include a mirror assembly 86 that is mounted to the base plate 84. For example, the mirror assembly 86 may include one or more hinges 88 pivotably coupled to the base plate 84 to allow for rotation and/or deflection of the mirror assembly 86 with respect to the base plate 84.

As illustrated in FIGS. 8 and 9, the drive assembly 64 can include a tilt motor 90 (e.g., a stepper motor) operably coupled to a first pulley 92. The drive assembly 64 can include a drive belt 94 (e.g., a toothed belt) connected to the first pulley 92 and to a second pulley 96. The first pulley 92 and second pulley 96 can be mounted to the lower housing 42 of the DES 34 or to some other fixed structure. The tilt motor 90 can be configured to rotate the first pulley 92 to rotate the second pulley 96 via the drive belt 94. In some embodiments, the tilting assembly can include a meshed gear arrangement between the tilt motor 90 and the base plate 84 to facilitate rotation of the base plate 84. The MES 80 can include a bracket 97 rotationally locked to the second tilt pulley 96 and configured to rotate about a tilt axis 99. The bracket 97 can be mounted to the base plate 84 such that rotation of the second pulley 96 rotates the base plate 84.

Referring to FIG. 9, the MES 80 can include an inspection plate 100. The inspection plate 100 can be, for example, a transparent plate used during inspection of the phone or other electronic device 54. The inspection plate 100 can be constructed from glass, polymer, or some other suitable material (e.g., a transparent or translucent material). For example, the inspection plate 100 can be constructed from an oleophobic material or coated with an oleophobic material. Use of an oleophobic material or other smudge-resistant material can improve the performance of the kiosk 10 and reduce the need for frequent servicing to clean the inspection plate 100. In some embodiments, the inspection plate 100 and the base plate 84 are formed together as a single piece of transparent material. In some embodiments, the inspection plate 100 is mounted to the base plate 84. For example, the base plate 84 can have an aperture sized and shaped to receive the inspection plate 100. Preferably, the upper camera 60 has a field of vision that includes all or most of the inspection plate 100.

As further illustrated in FIG. 9, the mirror assembly 86 can include a mirror plate 102 that generally surrounds the inspection area 50 on at least two sides. In some embodiments, the mirror assembly 86 includes one or more mirrors mounted to a mirror frame 104 that extends around the inspection area 50 on at least two sides. The mirror frame 104 can be formed as part of, or otherwise connected to the mirror plate 102. The mirror plate 102 and/or the mirror frame 104 can be hingedly (e.g., rotatably) connected to the base plate 84 or some other structure of the kiosk 10. In the illustrated embodiment, the mirror assembly 86 includes a first side mirror 106a positioned on a first side of the inspection area 50 and a second side mirror 106b on a second side of the inspection area 50 opposite the first side mirror 106a. In some embodiments, the mirror assembly 86 further includes a top side mirror 106c extending at least partially between the first and second side mirrors 106a, 106b. One or more of the mirrors 106a, 106b, 106c can be arranged at an angle with respect to the mirror plate 102. The angle(s) of the mirrors 106a-c with respect to the mirror plate 102 can be, for example, between 10°-85°, between 20°-80°, between 25°-55°, between 30°-60°, between 45°-65°, and/or between 40°-50°. Angling the mirrors with respect to the mirror plate 102 can enable cameras in the inspection area 50 to obtain reflected views of the sides of the phone or other electronic device 54 during inspection from a direction perpendicular or substantially perpendicular to the inspection plate 100.

In some embodiments, a lower side of the mirror frame 104 can include a shelf member 110 having one or more ridges 112, ribs, or protrusions. These ridges 112 can be configured to provide a gap G between the bottom end of the electronic device 54 and the shelf member 110. Spacing the bottom end of the phone or other electronic device 54 away from the shelf member 110 can allow light to show through the gap G so that the bottom edge of the electronic device 54 can be observed by the cameras or other imaging equipment of the kiosk 10. Viewing the bottom edge of the electronic device 54 can facilitate easier and/or more accurate evaluation of the overall size of the electronic device 54, as well as easier detection of damage to the bottom edge of the electronic device 54. In some embodiments, the ridges 112 or some other portion of the shelf member 110 include one or more lips or protrusions configured to reduce the likelihood that the electronic device 54 tips over and away from the inspection plate 100 as the inspection plate 100 moves between its various positions (see discussion of FIGS. 11A-11C below). The shelf member 110 can also include a connector slot or connector aperture through which a connector 114 from the connector carrier 85 can be inserted to connect to the phone. Further details describing structure and operation of the connector carrier 85 are described in U.S. Provisional Patent App. No. 62/804,714, titled CONNECTOR CARRIER FOR ELECTRONIC DEVICE KIOSK and filed Feb. 12, 2019, and also in U.S. Ser. No. 16/788,153, titled CONNECTOR CARRIER FOR ELECTRONIC DEVICE KIOSK and filed Feb. 11, 2020, the entire disclosures of which are incorporated by reference herein.

Figure 10A:
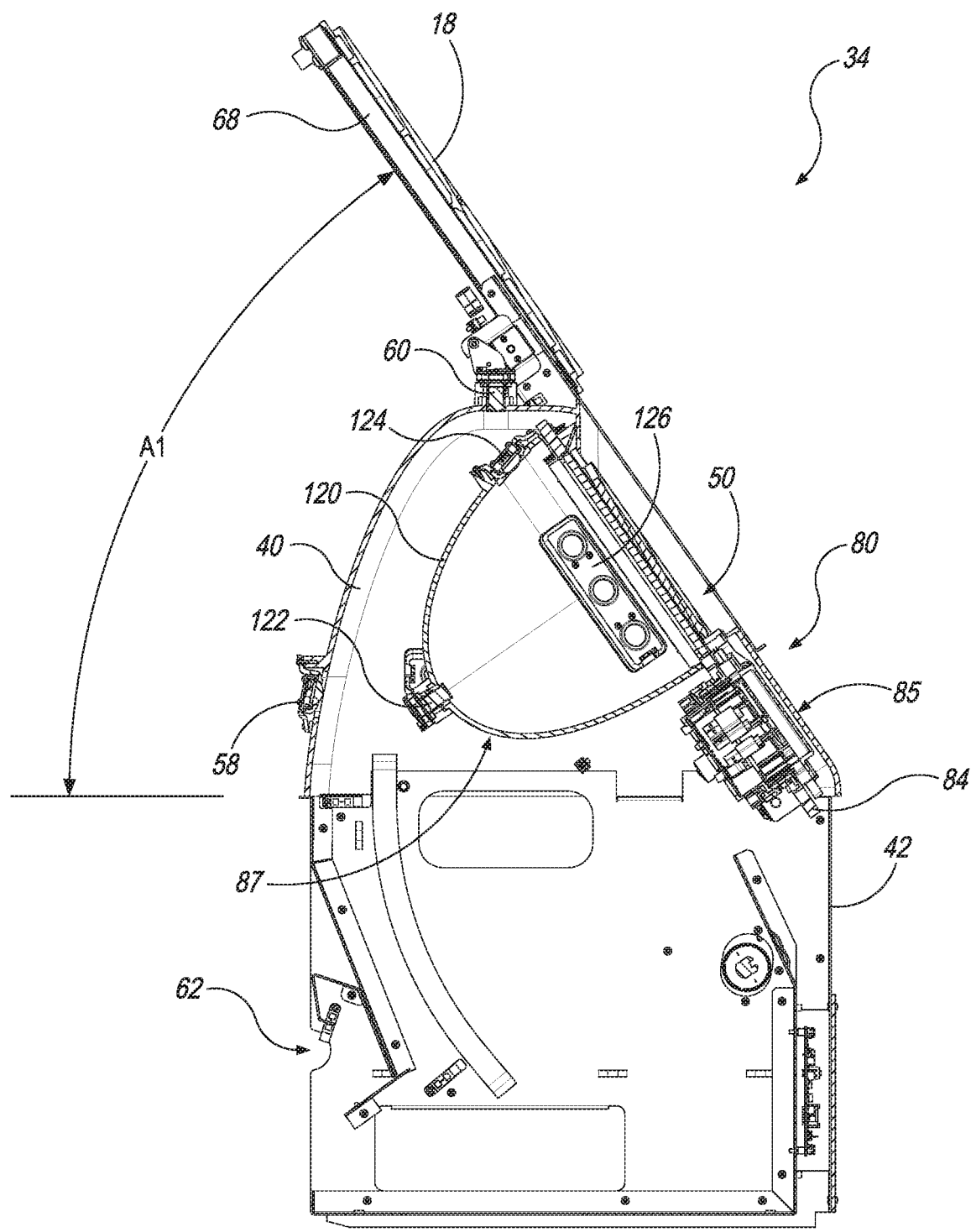
FIG. 10A is a cross-sectional side view of the DES of FIG. 7A taken along cut-plane A-A of FIG. 7B, in which a tilting assembly is in a home position and an access door is opened.

FIG. 10A is a cross-sectional side view of the DES 34 that shows the DES 34 in an initial or "home" position the MES 80 is arranged at an angle with respect to horizontal. For example, the angle A1 between the base plate 84 and horizontal can be less than 90° and greater than 0°. In some embodiments, the angle between the base plate 84 and horizontal is between 40°-80°, between 55°-75°, between 10°-85°, between 45°-70°, and/or between 30°-65° when the DES 34 is in the home position. In some embodiments, the angle between the base plate 84 and horizontal is approximately 60°. Orienting the base plate 84 at an angle less than 90° with respect to horizontal when in the home position can reduce the risk of the phone 54 inadvertently falling out of the inspection area 50. Orienting the base plate 84 an angle greater than 0° with respect to horizontal when in the home position can reduce the required depth of the kiosk 10 to accommodate the access door assembly 44 and/or other components of the kiosk 10, thereby reducing the overall size and/or footprint of the kiosk 10. In some embodiments, as illustrated in FIGS. 8 and 11D, the MES 80 can include one or more locking mechanisms 141 configured to selectively engage portions of the kiosk 10 (e.g., portions of the lower housing 42 of the DES 34) to inhibit or prevent inadvertent transition of the MES 80 between tilting positions.

As illustrated in FIG. 10A, the lower dome assembly 87 can include a lower dome 120 having a curved dome/ bulbous shape. The lower dome 120 can be mounted to the base plate 84 such that the lower dome assembly 87 moves with the base plate 84 as the MES 80 drives the base plate 84 between various positions. In some embodiments, the lower dome assembly 87 includes one or more cameras and/or lighting assemblies used to inspect the phone or other electronic device. For example, the lower dome assembly 87 can include a lower camera 122 mounted to the lower dome 120. The lower camera 122 can have a field of vision that includes all or most of the inspection plate 100. In some embodiments, the lower dome assembly 87 includes first and second lighting assemblies 126, 124. Returning to FIG. 9, the mirror frame 104 can include one or more calibration structures configured to facilitate calibration of the cameras 60, 122 (e.g., after installation, repair, replacement, and/or refurbishment of one of the cameras). For example, the mirror frame 104 can include one or more visual indicators 91 (e.g., dots, protrusions, indentations, etc.) located at known positions on the mirror frame 104 and observable by one or both of the cameras 60, 122. The visual indicators 91 can be used to recalibrate evaluation of and/or scale images captured by the cameras 60, 122. One or more of the lighting assemblies (e.g., the lower rear lighting assembly 124) can be mounted on a back side of the lower dome 120. In some embodiments, another lighting assembly (e.g., the lower side lighting assembly 126) is positioned on a side of the lower dome 120.

Figure 10B:
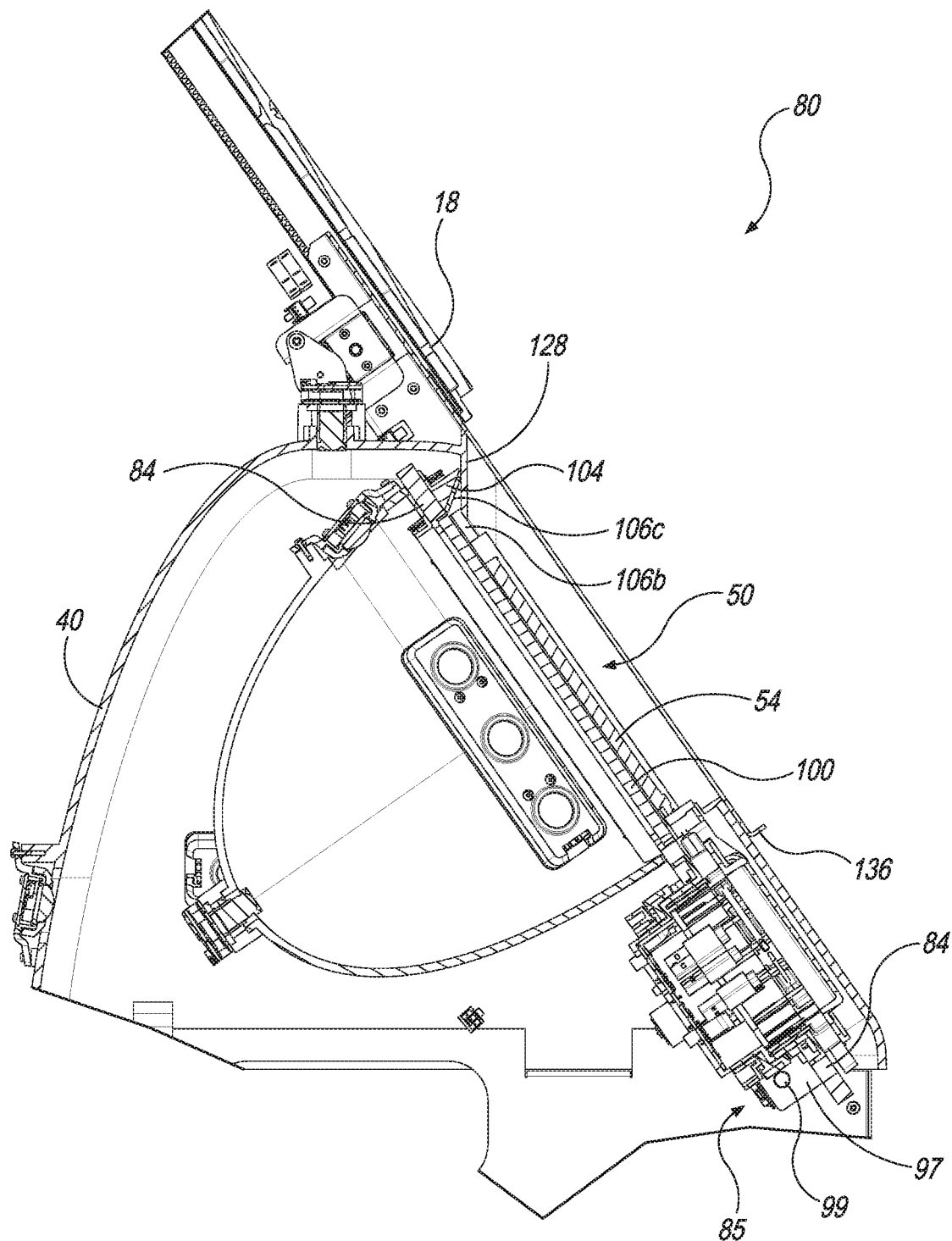
FIG. 10B is an enlarged cross-sectional side view of the tilting assembly of FIG. 7A taken along cut-plane A-A of FIG. 7B, in which the tilting assembly is in the home position and the access door is opened.

FIG. 10B illustrates an enlarged side view of the MES 80 and other components of the kiosk 10. The upper DES housing 40 can include one or more rims or edges 128 at the boundaries of the inspection area 50. When the MES 80 is in the home position as shown, the rims 128 of the upper DES housing 40 can overlap the mirror frame 104 such that access to the interior of the upper and lower DES housings 40, 42 is closed to outside access. Access to the connector carrier 85 is also blocked by the interface between the upper DES housing 40 and the mirror frame 104.

Figure 11B:
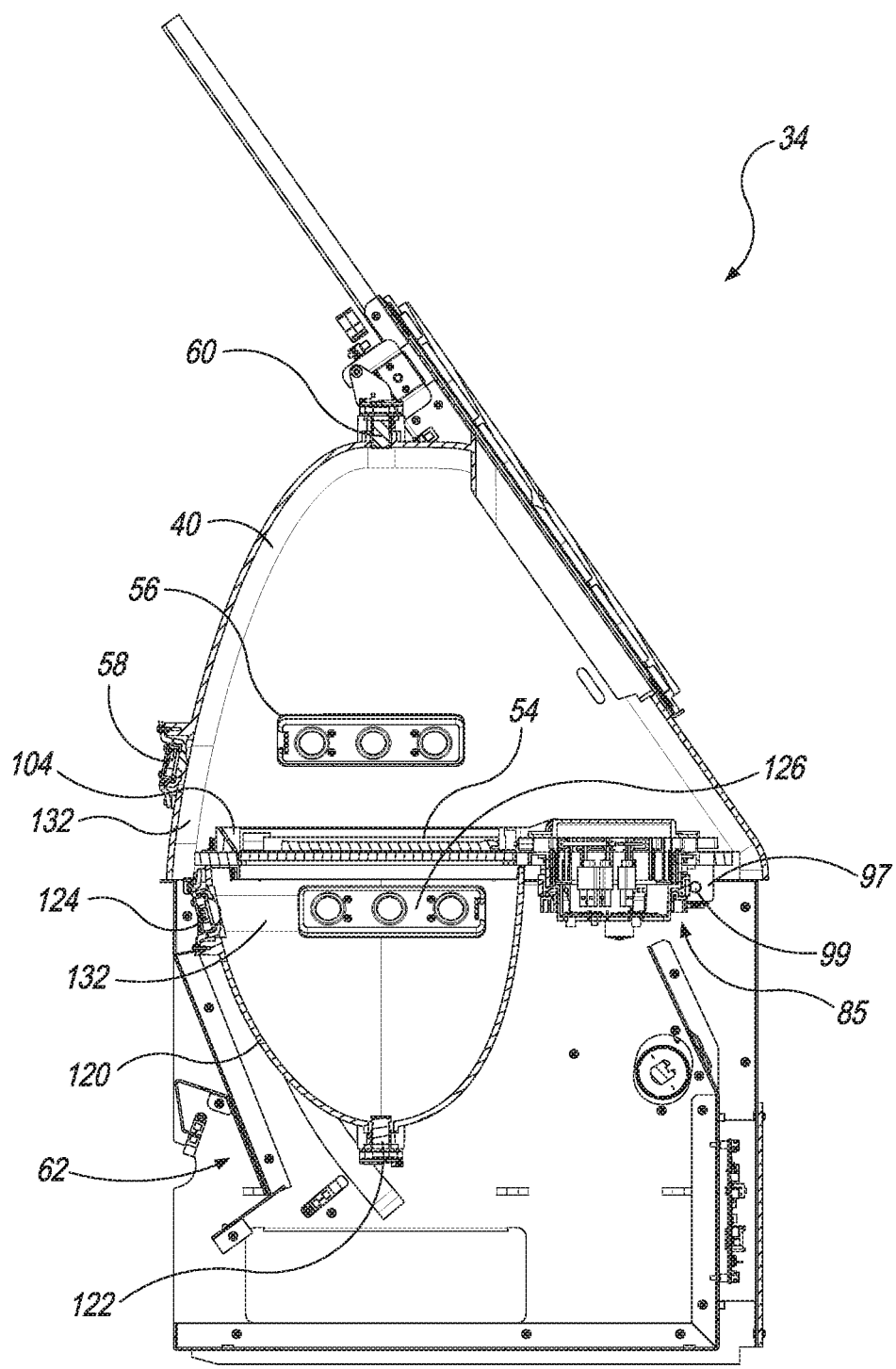
FIG. 11B is a cross-sectional side view of the DES of FIG. 7A taken along cut-plane A-A of FIG. 7B, in which the tilting assembly is in a grading position and the access door is closed.
Figure 11C:
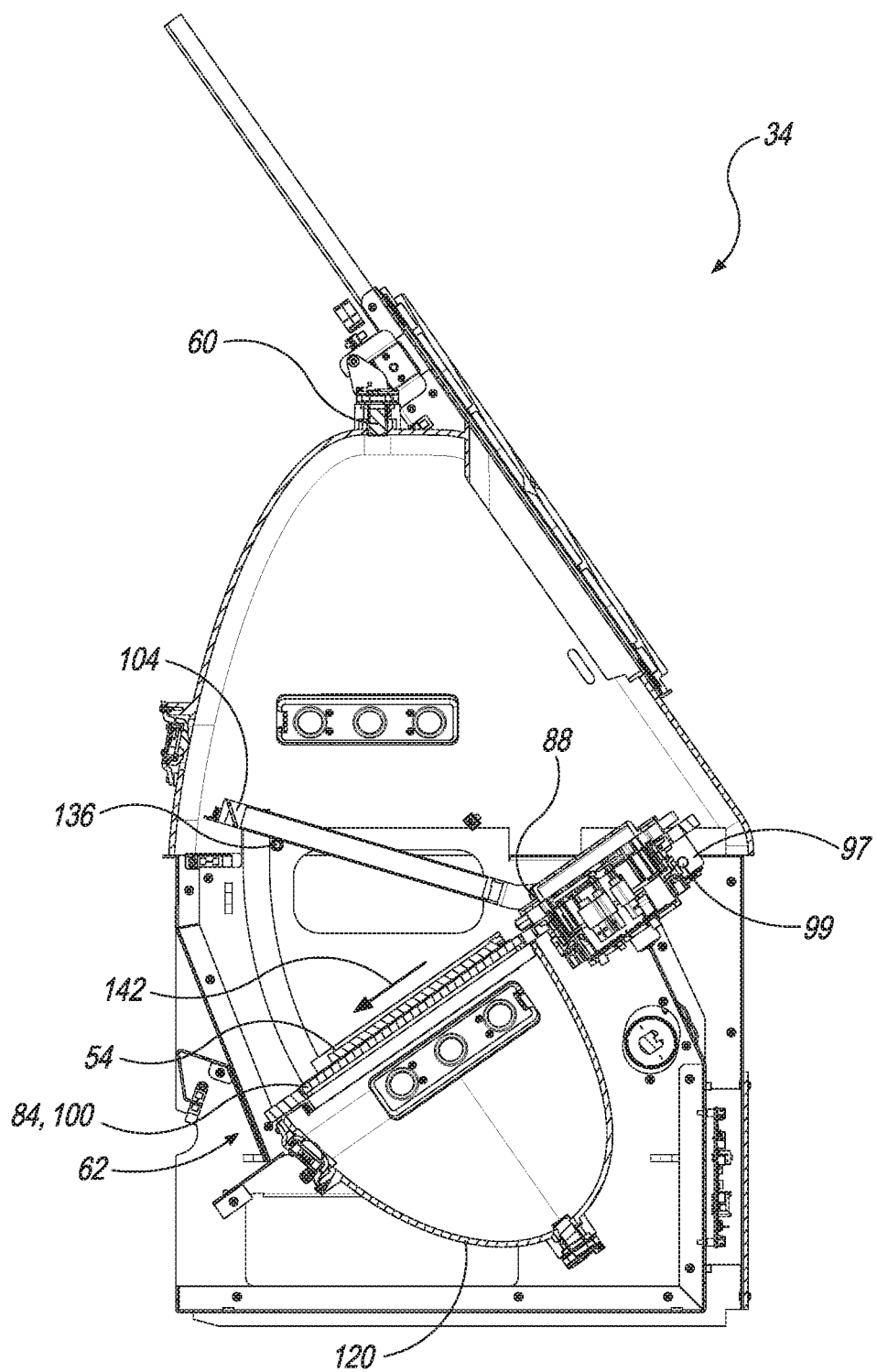
FIG. 11C is a cross-sectional side view of the DES of FIG. 7A taken along cut-plane A-A of FIG. 7B, in which the tilting assembly is in a binning position and the access door is closed.
Figure 11D:
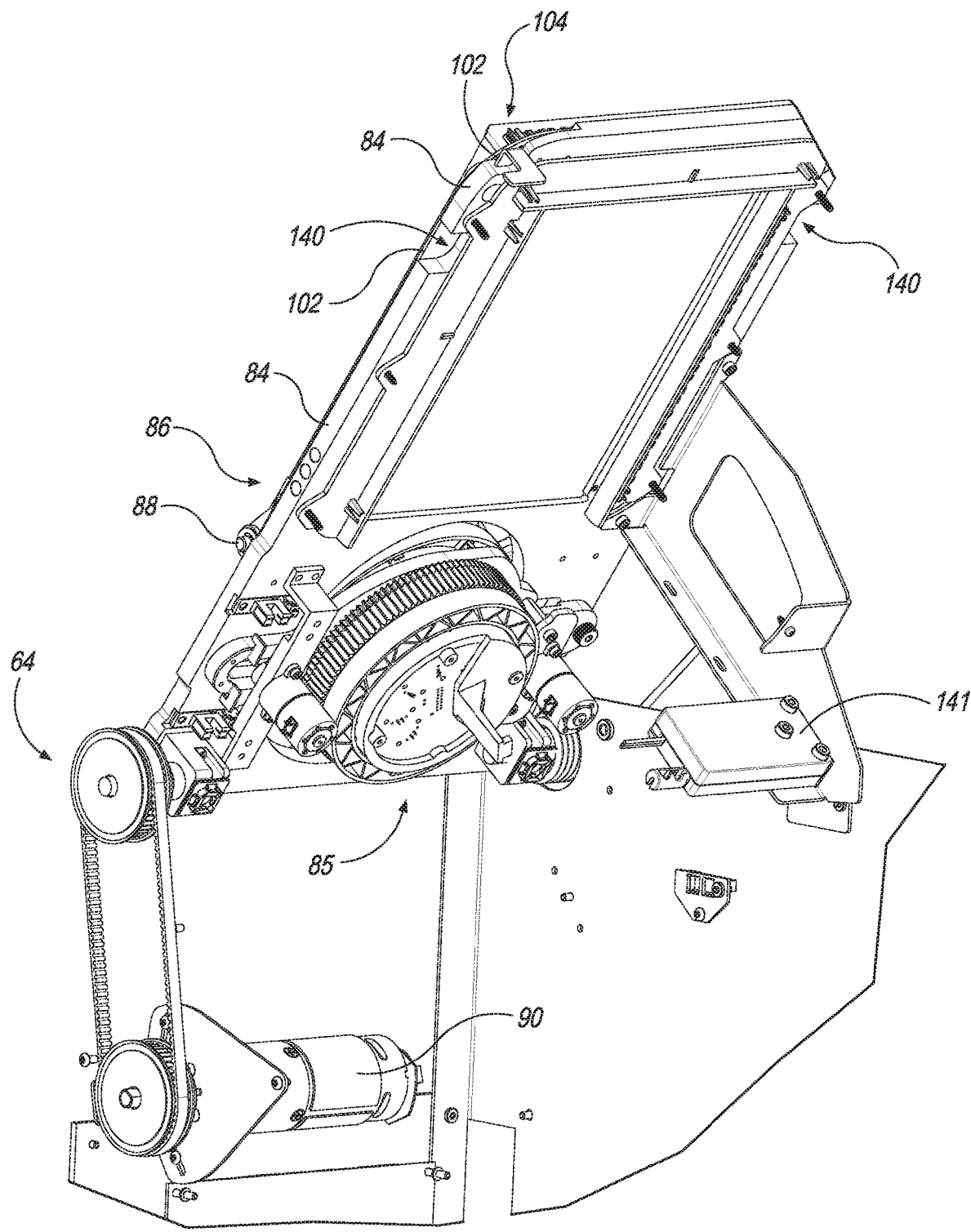
FIG. 11D is a back, top, right isometric view of the DES of FIG. 7A with the upper and lower housings removed for purposes of illustration.

FIGS. 11A-11C are left side cross-sectional views illustrating the DES 34 in the home position, an inspection position, and a binning position, respectively. More specifically, FIG. 11A illustrates the access door 18 and the MES 80 in their respective default positions (e.g., the positions in which they are positioned in the absence of interaction with a user or maintenance staff). In the default position, the access door 18 is closed, thereby blocking access to the inspection area 50 of the DES 34. A user may instruct the kiosk 10 (e.g., via a touch screen portion of one of the displays 16a-b, and/or via one of the user interface devices 14a-d) to open the access door 18 (e.g., as illustrated in FIG. 10B) to allow for placement of a phone or other electronic device 54 into the inspection area 50. For example, the user may tap or press one or more buttons or icons on the displays 16a-b or on the keypad 14a associated with a request to begin a transaction. The user may specify, via one or more of the user interface devices 14a-d (FIG. 1) and/or via a touch screen portion of one of the displays 16a-b, the make and/or model of the user's electronic device 54. The connector carrier 85 can rotate and/or move toward the inspection area 50 and present the relevant connector 114 (FIG. 9) to the inspection area 50. After the user inputs the electronic device 54 into the inspection area 50 and connects a connector 114 (FIG. 9) thereto, the user may instruct the kiosk 10 (e.g., via a touch screen portion of one of the displays 16a-b, and/or via one or more of the user interface devices 14a-d) to evaluate the electronic device 54 for trade-in and/or purchase value. In some embodiments, before closing the access door 18 and/or prior to placement of the electronic device 54 into the inspection area 50, the kiosk 10 may use the lower camera 122 to take a picture of the user through the inspection plate 100 (e.g., for adherence to second-hand dealer laws and/or for other security purposes). As illustrated in FIGS. 10B and 11A, the kiosk 10 can include one or more door stops 136 configured to limit downward movement of the access door 18 and/or to define the closed position of the access door 18.

As illustrated in FIG. 11B, the MES 80 can rotate from the home position to an evaluation (e.g., grading, inspection, etc.) position. In some embodiments, the base plate 84 and/or inspection plate 100 are positioned substantially horizontal when in the evaluation position. The kiosk 10 can be configured to evaluate the electronic device 54 when the MES 80 is in the evaluation position. Evaluation of the electronic device 54 can include visual evaluation (e.g., via the cameras 60, 122) and/or electrical evaluation (e.g., via the connector 114 and/or via a software application or wireless connection) to determine various information about the device that can affect the monetary value of the device. Such information can include, for example, the make, model, sub-model of the device, the device features (e.g., memory size, cell service carrier, etc.), device operability, device charge and/or rechargeability, physical condition (e.g., presence or absence of cracks, display function and condition, etc.

Electrical evaluation, visual evaluation, grading, detection of cracks and/or of screen covers, and/or other evaluation and analysis of the electronic device 54 can be performed as described in U.S. Pat. Nos. 10,496,963; 10,475, 002; 10,445,708; 10,438,174; 10,417,615; 10,401,411; 10,269,110; 10,157,427; 10,127,647; 10,055,798; 10,032, 140; 9,911,102; 9,904,911; 9,885,672; 9,881,284; 9,818, 160; 8,463,646; 8,423,404; 8,239,262; 8,200,533; 8,195, 511; and 7,881,965; U.S. patent application Ser. Nos. 12/573,089; 12/727,624; 13/113,497; 12/785,465; 13/017, 560; 13/438,924; 13/753,539; 13/658,825; 13/733,984; 13/705,252; 13/487,299; 13/492,835; 13/562,292; 13/658, 828; 13/693,032; 13/792,030; 13/794,814; 13/794,816; 13/862,395; 13/913,408; 14/498,763; 14/500,739; 14/873, 158; 14/506,449; 14/925,357; 14/925,375; 14/934,134; 14/964,963; 14/568,051; 14/966,346; 14/598,469; 14/660, 768; 14/663,331; 15/057,707; 15/091,487; 15/214,791; 15/630,460; 15/641,145; 15/672,157; 15/855,320; 15/901, 526; 15/977,729; 16/195,785; 16/357,041; 16/534,741; 16/556,018; 16/556,104; 16/575,003; 16/575,090; and Ser. No. 16/601,492, and 16/719,699; U.S. Provisional Application No. 62/169,072, titled "METHODS AND SYSTEMS FOR VISUALLY EVALUATING ELECTRONIC DEVICES," filed by the applicant on Jun. 1, 2015; U.S. Provisional Application No. 62/202,330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; U.S. Provisional Application No. 62/332,736, titled "METHODS AND SYSTEMS FOR DETECTING DAMAGE IN EDGE REGIONS OF MOBILE ELECTRONIC DEVICES," filed by the applicant on May 6, 2016; U.S. Provisional Application No. 62/804,714, titled "CONNECTOR CARRIER FOR ELECTRONIC DEVICE KIOSK," filed by the applicant on Feb. 12, 2019; U.S. Provisional Application No. 62/807,153, titled "KIOSK FOR EVALUATING AND PURCHASING USED ELECTRONIC DEVICES," filed by the applicant on Feb. 18, 2019, and U.S. Provisional Application No. 62/807,165, titled "NEURAL NETWORK BASED PHYSICAL CONDITION EVALUATION OF ELECTRONIC DEVICES, AND ASSOCIATED SYSTEMS AND METHODS," filed by the applicant on Feb. 18, 2019, and U.S. Provisional Application No. 62/950,075, titled "SYSTEMS AND METHODS FOR VENDING AND/OR PURCHASING MOBILE PHONES AND OTHER ELECTRONIC DEVICES," filed by the applicant on Dec. 18, 2019. All the patents and patent applications listed in the preceding sentence and any other patents or patent applications identified herein are incorporated herein by reference in their entireties.

In some embodiments, evaluation (e.g., electrical and/or visual inspection) of the electronic device 54 include obtaining characteristic information about the electronic device 54, which can include device identification, make, model, and/or configuration. In other embodiments, the characteristic information can further include device functionality including hardware/software configuration, charging capability, memory capacity, etc. Information necessary to identify and/or evaluate a mobile device can include, for example, a unique identifier (e.g., an IMEI number or an MEID or equivalent number of a mobile phone, a hardware media access control address (MAC address) of a networkable device, or a model number and serial number of the electronic device); information describing the device manufacturer (e.g., a manufacturer name or ID code), model, characteristics and capabilities (e.g., CPU type and speed, storage capacity (SRAM, DRAM, disk, etc.), wireless carrier, radio bands (frequency ranges and encodings such as CDMA, GSM, LTE, etc.), and/or color, condition; and so on. In some embodiments, the electrical analysis can include evaluating the condition and/or functionality of the charging circuit of the electronic device. In particular, the testing electronics can measure the amount of charge current that the charging circuit draws on the power lines, and the testing electronics can use the corresponding current measurement signal to determine whether the charging circuit is functional or damaged. In some embodiments, the kiosk 10 can perform the electrical analysis using one or more of the methods and/or systems described in detail in the commonly owned patents and patent applications identified herein and incorporated by reference in their entireties.

In some embodiments, the inner surface (or at least a majority thereof) of one or both of the upper dome 40 and the lower dome 120 is gray in color. Using gray upper and/or lower domes 40, 120 can enhance the vividness of shadows of the electronic device 54 cast onto the upper and lower domes 40, 120. For example, the gray color of the domes 40, 120 can absorb a portion of the light cast by the light assemblies, thereby reducing glare and increasing the vividness/crispness of the shadows. In some embodiments, one or both of the upper and lower domes 40, 120 can include a darkened (e.g., black, charcoal, or some other dark color) portion or band. For example, one or both of the domes can include a black band 132 on their respective inner surfaces. The black or darkened portions or bands 132 can absorb light and reduce glare within the domes 40, 120. Additionally or alternatively, in some embodiments, the upper and/or lower domes 40, 120 include one or more apertures therethrough to allow light to escape, thereby reducing glare within the inspection area 50 and on the inner surface of the domes 40, 120. The darkened portions and/or apertures can reduce unwanted reflections of light from the phone or electronic device 54 (e.g., reflections from curved/beveled corners and/or edges) to allow for increased accuracy and reliability in the evaluation/grading process.

After the kiosk 10 evaluates the electronic device 54 as described above, the user is presented with a purchase offer via, for example, one of the displays 16a-b. The purchase price can be offered/paid in the form of, for example, cash, a voucher redeemable for cash, merchandise, services, etc., electronic value (e.g., bitcoin, e-certificates, credit to electronic payment account, etc.), credit (e.g., a prepaid credit card, debit card, gift card, etc.), coupons, loyalty points, and/or other forms of value. If the user rejects the offer (e.g., via a touch screen portion of one of the displays 16a-b, and/or via one of the user interface devices 14a-d), the MES 80 returns to the home position (FIG. 11A), the access door 18 opens, and the connector 114, if still connected to the electronic device 54, disconnects from the electronic device 54. In some transactions, the electronic device 54 may be displaced on the inspection plate 100 from its original home position. For example, the electronic device 54 may tilt in a direction parallel to the face of the inspection plate 100. In some such situations, the electronic device 54 may become jammed between, for example, the access door frame 46 and the inspection plate 100. The kiosk 10 can be configured to detect such a jam and retract the MES 80 a small distance toward the evaluation position. The MES 80 may be locked in this intermediate position while the access door 18 opens to allow the user to retrieve their electronic device 54. Use of this intermediate position (e.g., a locked intermediate position) between the evaluation position and the home position can reduce the likelihood of damage to the electronic device 54 and/or to the kiosk 10 during operation.

If the user accepts the offer from the kiosk 10 and inputs that decision into the kiosk 10 (e.g., via a touch screen portion of one of the displays 16a-b, and/or via one of the user interface devices 14a-d), the MES 80 rotates further downwardly about the pivot axis 99, as illustrated in FIG. 11C. In some embodiments, the offer price (e.g., cash, voucher, or some other type of remuneration) is dispensed to the user after acceptance (e.g., via the payment dispenser 14c and/or electronically into an account of the user). In some embodiments, the DES 34 includes a mirror stop 136 configured to engage the mirror frame 104 and prevent it from tilting down beyond a predetermined position (e.g., beyond the grading position). For example, the mirror stop 136 can contact a portion of the mirror frame 104 and/or the mirror plate 102 to prevent movement of the mirror assembly 86 downwardly past the mirror stop 136. As illustrated in FIG. 11D, the base plate 84 can include one or more notches 140 configured to allow the base plate 84 to move past the one or more mirror stops 136 as the MES 80 rotates between the grading position and the binning position. As illustrated in FIG. 11C, the mirror frame 104 can tilt upward relative to the hinges 88 (due, e.g., to the interference by the mirror stop 136) while the remainder of the MES 80 tilts downward. Separating the mirror frame 104 from the inspection plate 100 in this manner enables the electronic device 54 to slide off the inspection plate 100 in a direction 142 toward the chute 62 without hitting or otherwise contacting the mirror frame 104.

Figure 12A:
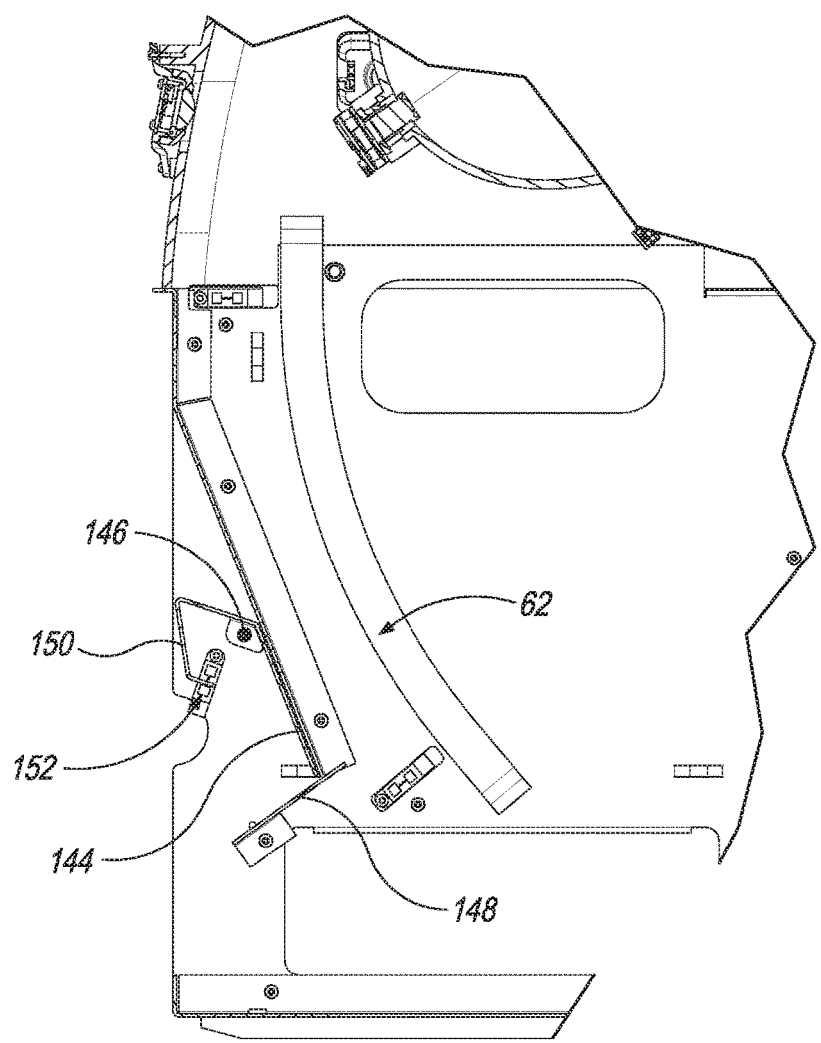
FIG. 12A is an enlarged cross-sectional side view of a chute of the DES of FIG. 7A taken along the cut-plane A-A of FIG. 7B.

FIG. 12A is an enlarged elevation view of the chute 62 and associated components. The chute 62 can include a moveable flap or panel 144. The panel 144 can be configured to rotate about a hinge 146. When the phone or other electronic device 54 contacts the panel 144, the panel 144 can rotate about the hinge 146 to dampen the momentum of the electronic device 54 and reduce the risk of damage to the electronic device 54 during the binning process. A counterbalance 150 can be connected to the panel 144 on a side of the hinge 146 opposite the panel 144. The counterbalance 150 can be sufficiently heavy to bias the panel 144 to the closed position illustrated in FIG. 12A, but light enough to permit a phone or electronic device 54 to deflect the panel 144 as the electronic device 54 passes through the chute 62. After sliding down the panel 144, the device 54 contacts a lower plate 148 configured to direct the electronic device 54 into a waiting bin 170. In some embodiments, the chute 62 includes a sensor 152 (e.g., a Hall-effect sensor or other sensor) configured to detect when the panel 144 is in a deflected position. Should the sensor 152 detect that the panel 144 remains in the deflected position for longer than a predetermined period of time (e.g., less than 2 seconds, less than 5 seconds, less than 10 seconds, and/or less than 30 seconds), the kiosk 10 can be configured to cease operation and/or alert repair personnel that the chute 62 is malfunctioning. Such malfunctions can include a full or overfull bin, an electronic device stuck in the chute 62, and/or other malfunction.

Figure 12B:
FIG. 12B is a schematic side view of a storage bin.

In some embodiments, as illustrated in FIG. 12B, the bin 170 includes a protrusion 172 (e.g., a conical, pyramidal, cylindrical, and/or some other shape) extending from a lower surface of the bin. The protrusion 172 can be sized and shaped such that electronic devices contact the protrusion 172 before settling in the bottom of the bin 170. The protrusion 172 can act a diverter to randomize the distribution of electronic devices within the bin 170 to reduce the likelihood of overfilling only a portion of the bin 170 while other portions of the bin remain unfilled. In some embodiments, the protrusion 172 provides a softer landing for the device 54 than the bottom of the bin 170 (e.g., the protrusion 172 breaks the fall of the electronic device 54 between the tilt plate and the bottom of the bin 170). In some embodiments, one or more of the cameras of the kiosk can be configured to monitor the transition of the electronic device 54 through the chute 62 to confirm exit of the electronic device 54 from the DES 34. In some embodiments, the bin 170 can be prelabelled, addressed, and/or otherwise ready for shipment once the bin 170 is sealed. In some embodiments, the kiosk 10 is configured to determine the amount of filler and/or air pouches recommended for inclusion in the bin 170 to reduce the likelihood of damage to the electronic devices in transit. Such determinations can be made, for example, based on automatic volume estimates based on the number and types of the electronic devices purchased by the kiosk 10 and introduced to the bin 170. The bin 170 can have a size and shape to encourage and/or ensure that the electronic devices are oriented in an orderly (e.g., co-aligned and/or stacked) configuration within the bin 170 to reduce wasted space in the bin 170. In some embodiments, maintenance of the kiosk and/or retrieval of the bins 170 is crowd-sourced. In some embodiments, independent vendors are notified of the types and quantities of electronic devices gathered in the bin 170 and given the opportunity to bid for or purchase the bin 170 and retrieve the bin 170 directly from the kiosk 10.

As those of ordinary skill in the art will appreciate, the foregoing routines are but some examples of ways in which the kiosk 10 can be used to recycle or otherwise process consumer electronic devices such as mobile phones. Although the foregoing examples are described in the context of mobile phones, it should be understood that kiosk 10 and various embodiments thereof can also be used in a similar manner for recycling virtually any consumer electronic device, such as MP3 players, tablet computers, PDAs, and other portable devices, as well as other relatively non-portable electronic devices such as desktop computers, printers, devices for playing games, entertainment or other digital media on CDs, DVDs, Blu-ray, etc. Moreover, although the foregoing examples are described in the context of use by a consumer, the kiosk 10 in various embodiments thereof can similarly be used by others, such as store clerk, to assist consumers in recycling, selling, exchanging, etc. their electronic devices.

Figure 13:
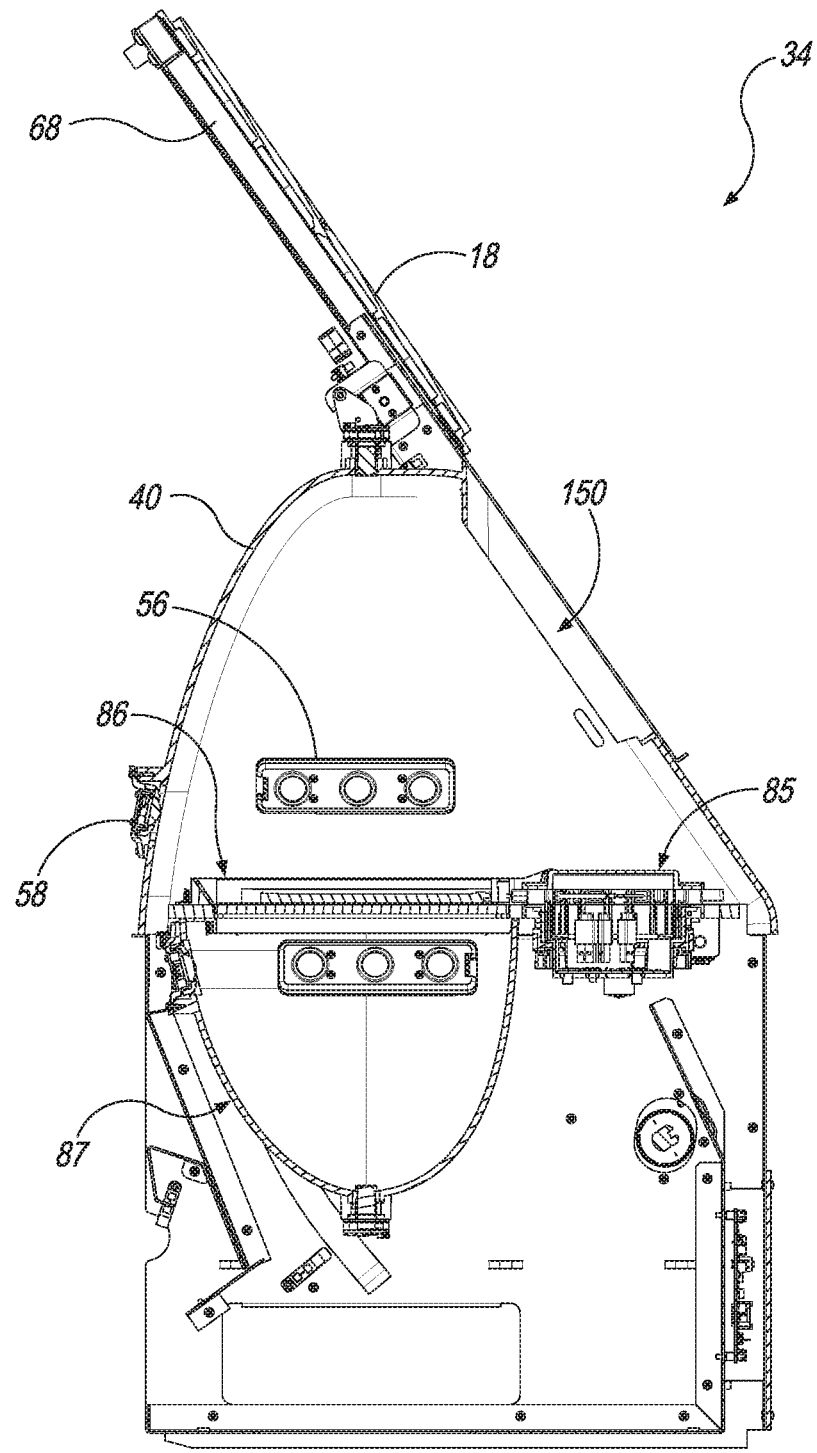
FIG. 13 is a cross-sectional side view of the DES of FIG. 7A taken along cut-plane A-A of FIG. 7B, in which the DES is in a repair or maintenance configuration.

FIG. 13 illustrates the DES 34 in a repair or maintenance position. In the repair position, the access door 18 is in the opened position and the MES 80 is in the grading (e.g., horizontal) position. In such a configuration, the repair personnel have access to the mirror assembly 86, lower dome assembly 87, connector carrier 85, and/or to other components in the interior of the DES 34 via an access aperture 150 in the upper dome 40.

Figure 14A:
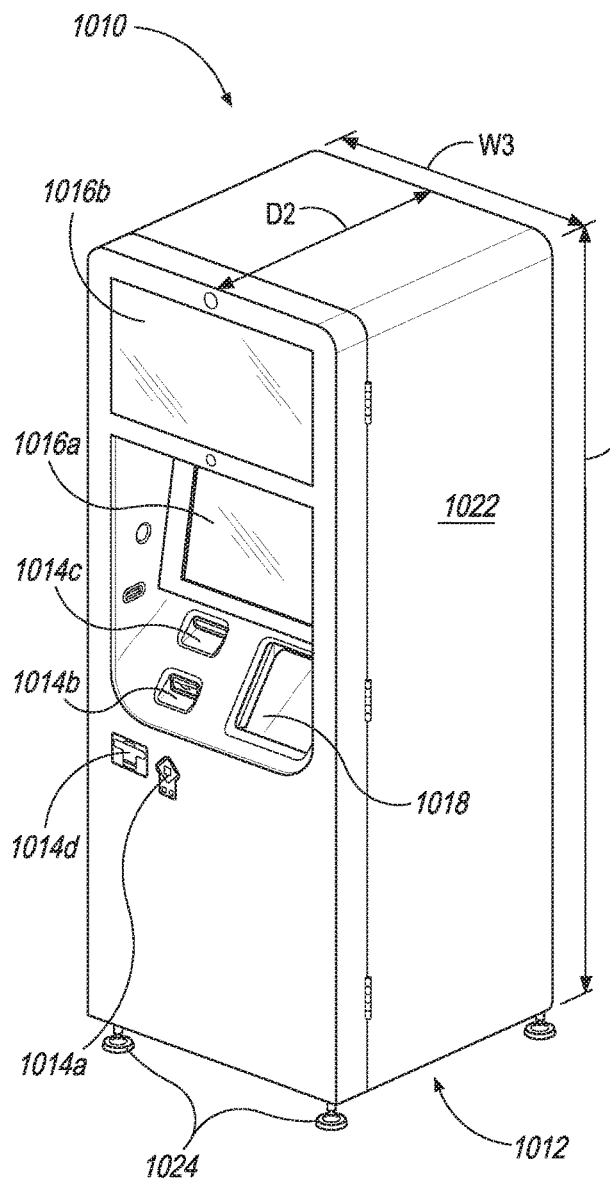
FIG. 14A is an isometric view of an electronic device recycling kiosk configured in accordance with other embodiments of the present technology.

FIG. 14A is a front isometric view of a kiosk 1010 configured in accordance with other embodiments of the present technology for purchasing electronic devices (e.g., mobile phones, tablets, etc.) from a user. Certain features of the kiosk 1010 (and of the DES 1034, described below) are similar in structure and/or function to, or the same as, features of the kiosk 10 described above. Such features of the kiosk 1010 are identified by reference numbers identical to those used with respect to the kiosk 10, but with the addition of 1000. For example, the kiosk 1010 includes first and second displays 1016a-b that are similar to or the same as the first and second displays 16a-b described above with respect to the kiosk 10. The kiosk 1010 can include a housing 1012 with a height H2, a depth D2, and a width W3 similar to or the same as the height H, the depth D, and the width W, respectively of the kiosk 10.

Figure 14B:
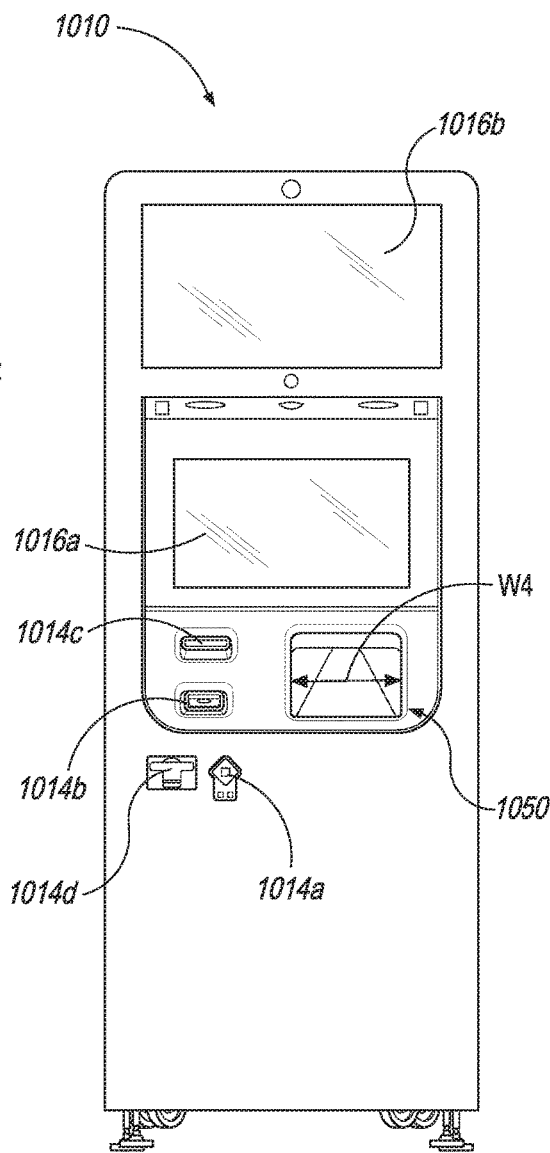
FIG. 14B is a front view of the kiosk of FIG. 14A.

FIG. 14B is a front view of the kiosk 1010 and illustrates an arrangement of user interface devices 1014a-d that is different from the arrangement of user interface devices 14a-d of the kiosk 10. For example, an ID card reader 1014b and a payment dispenser 1014c are positioned to one side of the electronic device inspection area 1050. A keypad 1014a and/or a receipt dispenser 1014d can also be positioned to the side and/or below the inspection area 1050. In some embodiments, one or more of the user interface devices 1014a-d are positioned above the inspection area 1050. The inspection area 1050 is positioned closer to a side of the kiosk 1010 (i.e., farther from the center of the kiosk 1010) than the area 50 of the kiosk 10. The inspection area 1050 can have a width W4 that is greater than the width W2 of the inspection area 50 described above. As explained below, the width W4 of the inspection area 1050 can be at least partially attributed to the presence of one or more connectors in addition to the connector carrier 85.

Figure 15A:
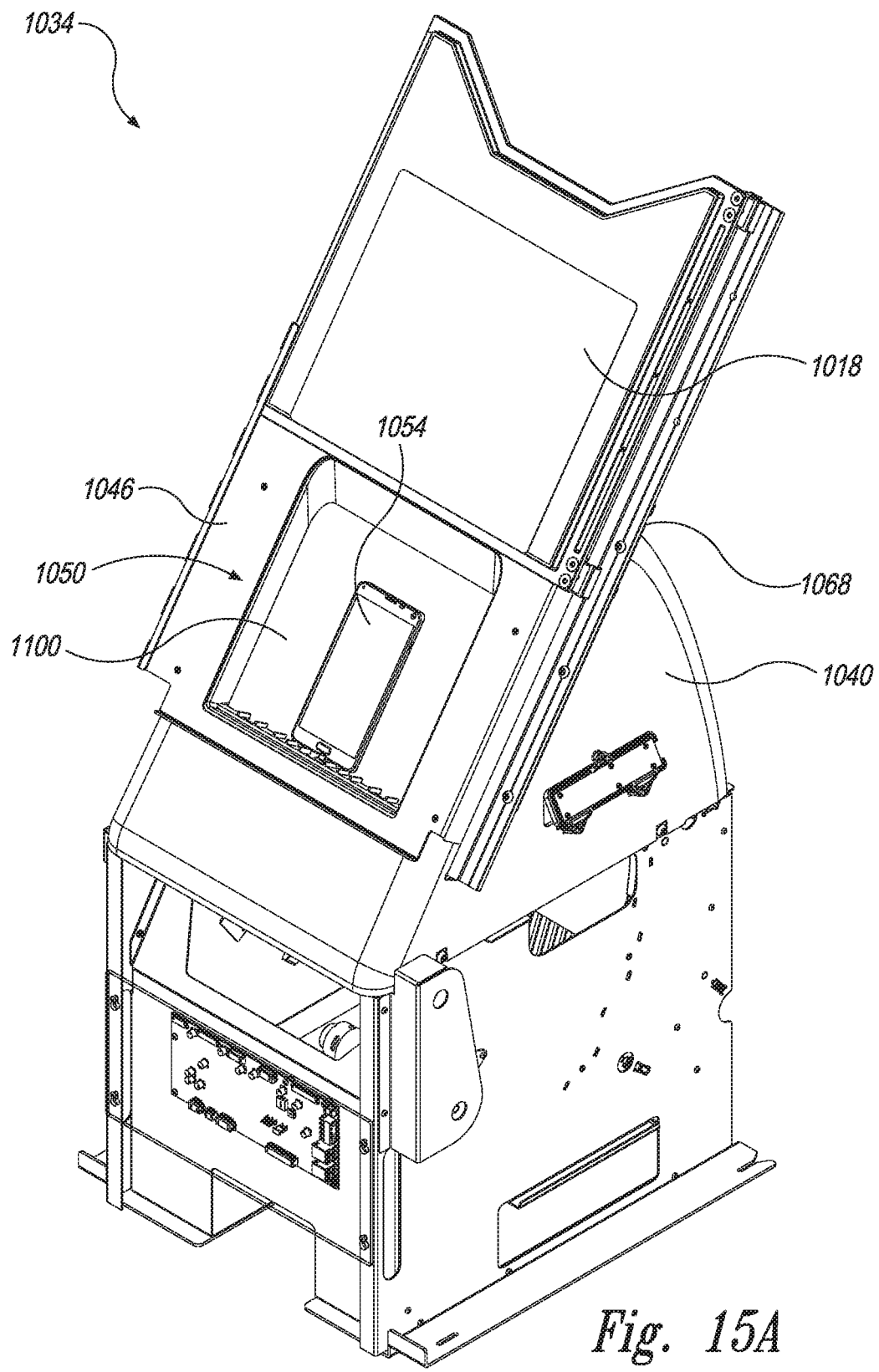
FIG. 15A is a front, top, right isometric view of an electronic device evaluation system (DES) of the electronic device recycling kiosk of FIGS. 14A and 14B configured in accordance with embodiments of the present technology.
Figure 15B:
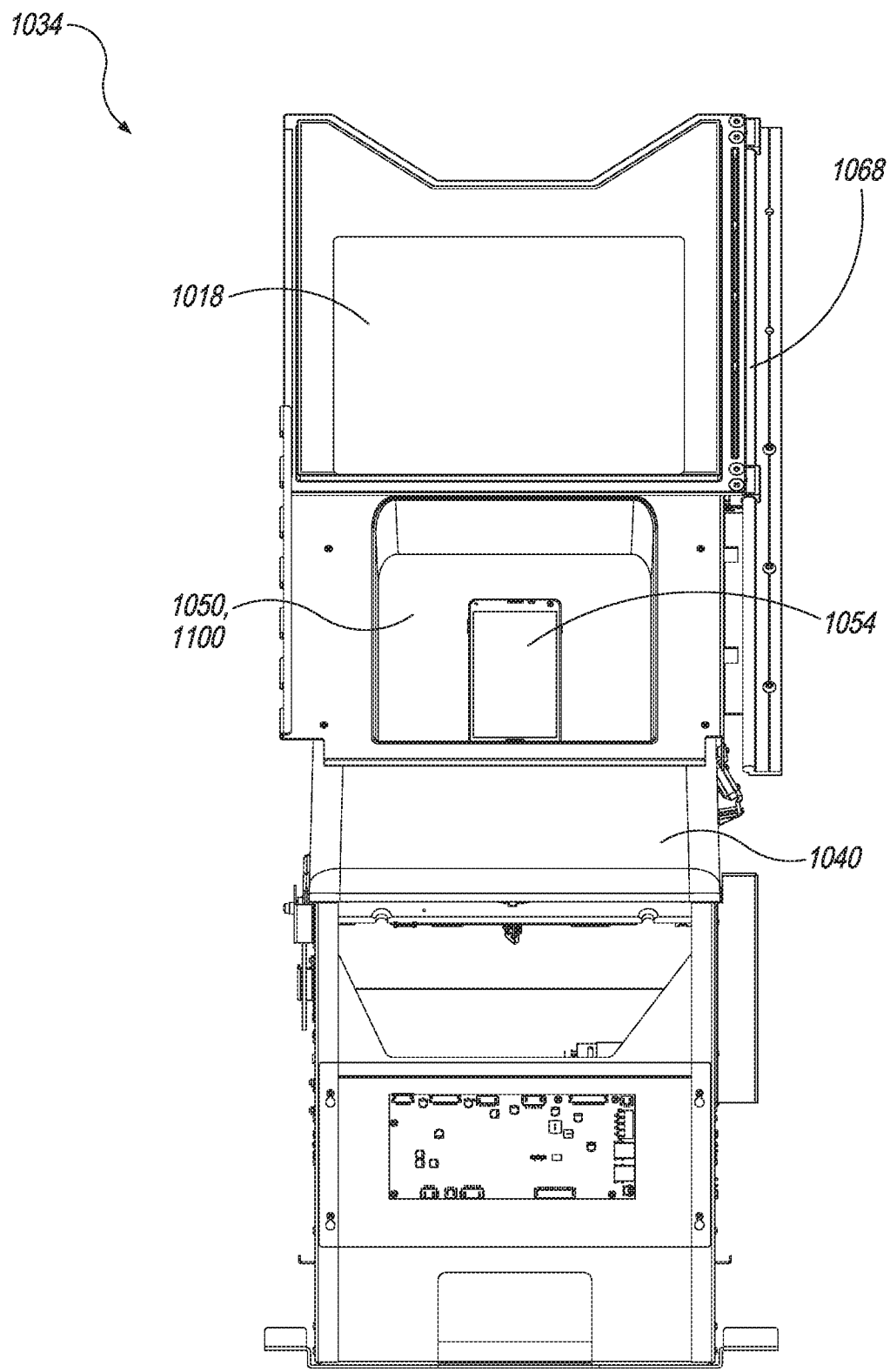
FIG. 15B is a front side elevation view of the DES of FIG. 15A.

FIGS. 15A and 15B are enlarged front isometric and front views, respectively, of the DES 1034 removed from the kiosk 1010 to better illustrate the components of the DES 1034. The DES 1034 includes an access door 1018 configured to slide along the track 1068 in a manner similar to the same as described above with respect to the door 18 and track 68 of the DES 34. Movement of the access door 1018 along the track 1068 can prohibit and allow access to the inspection area 1050. The track 1068 can be mounted to the upper DES housing 1040. In some embodiments, the track 1068 is mounted to the access door frame 1046.

In use, a mobile phone or other electronic device 1054 can be placed into or removed from the inspection area 1050 when the access door 1018 is in a raised position (i.e., the position illustrated in FIGS. 15A-15B). The DES 1034 can include an inspection plate 1100 similar to or the same as the inspection plate 100 described above. The inspection plate 100 can be connected to other mechanisms of the DES 1034 configured to tilt or otherwise move the inspection plate 1100 in a manner similar to or the same as the movement tilting of the inspection plate 100 described above. For conciseness, features of the DES 1034 which are functionally and/or structurally equivalent to the features of the DES 34 described above will not be re-described.

Figure 16A:
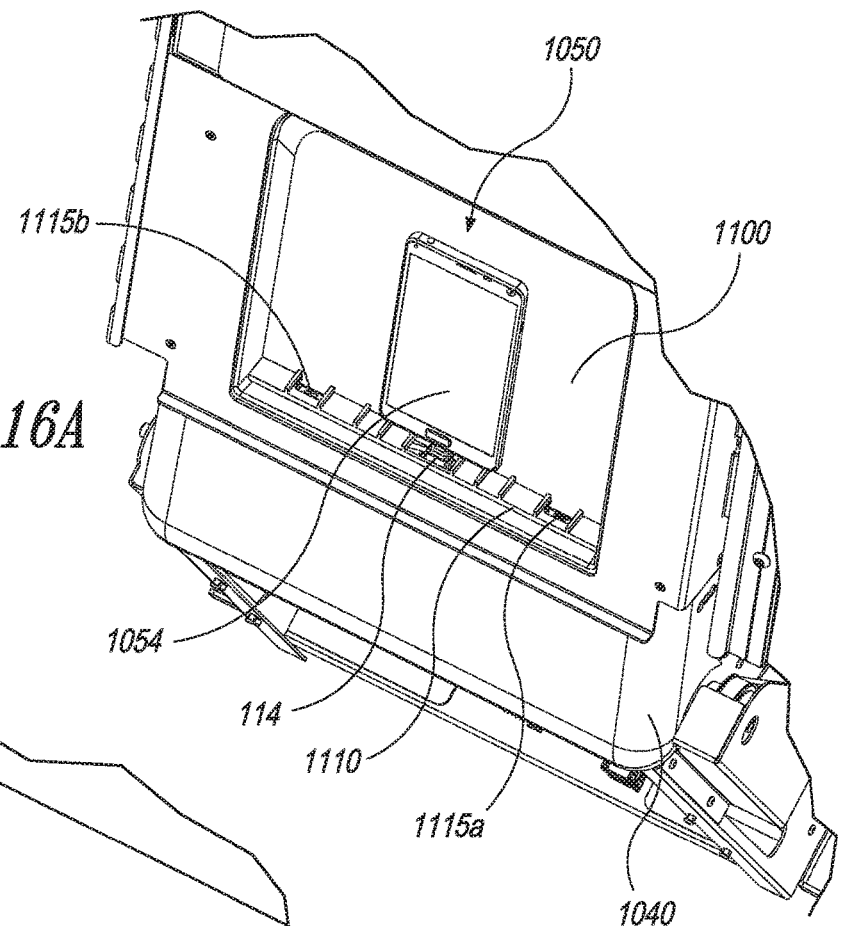
FIG. 16A is an enlarged front, top, right isometric view of an inspection area of the DES of FIG. 15A.

FIG. 16A is an isometric view of the inspection area 1050 of the DES 1034. The kiosk 1010 can include one or more secondary connectors 1115a-b in addition to the connector 114 (i.e., the connectors 114, collectively, of the primary connector carrier 85). For example, the kiosk 1010 can include a first secondary connector 1115a positioned to one side of the connector 114 and a second secondary connector 1115b positioned on an opposite side of the connector 114. The first and second secondary connectors 1115a-b (as well as the connector 114) can be selected so that all, or at least most, of the commercially available mobile phones and other mobile electronic devices can be connected to the primary connector carrier 85 and/or to the first and second secondary connectors 1115a-b. For example, in some embodiments the connectors 114, 1115a-b can include Mini-USB, Micro-USB, USB-C and/or Lightning connectors. Positioning the first and second secondary connectors 1115a-b on opposite sides of the primary connector carrier 85 can allow the primary connector carrier 85, and its several different connectors 114, to be used for non-foldable phones and other electronic devices while the secondary connectors 1115a-b are used to connect to foldable phones and other electronic devices with offset connection port. In some embodiments, both the first secondary connector 1115a and the second secondary connector 1115b are the same type of connector (e.g., Mini-USB, Micro-USB, USB-C, Lightning, etc.), and in other embodiments the first and second secondary connectors 1115a-b are different from each other.

As described above, the secondary connectors 1115a-b can be positioned to accommodate foldable phones or other electronic devices having data and/or electrical connectors in non-central positions. In some embodiments, the secondary connectors 1115a-b are configured to accommodate electronic devices having nonstandard connector types. The secondary connectors 1115a-b can be configured to remain retracted with the kiosk 1010 unless and until a user designates that they wish the kiosk 1010 to evaluate a foldable phone. The kiosk 1010 can be configured to extend one or both of the secondary connectors 1115a-b if a user indicates (e.g., via a touch screen on the displays 1016a-b) that the electronic device to be evaluated is a device with an offset electrical connector (e.g., a foldable phone).

Figure 16B:
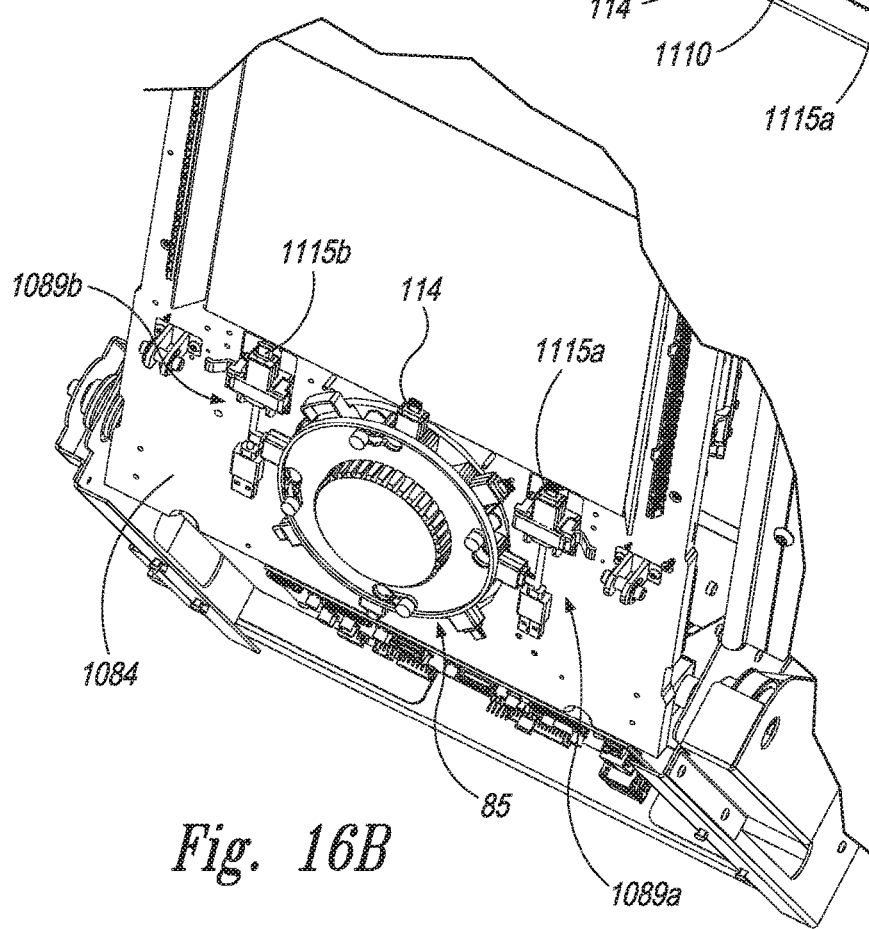
FIG. 16B is an enlarged front, top, right isometric view of the inspection area of the DES of FIG. 15A, with the upper DES housing removed for purposes of illustration.

FIG. 16B is an isometric view of the inspection area 1050 of the DES 1034 with the shelf 1110 and upper DES housing 1040 removed for clarity. The secondary connectors 1115a-b are connected to secondary connector assemblies 1089a-b. The secondary connector assemblies 1089a-b can be separate from the primary connector carrier 85. In some embodiments, the secondary connector assemblies 1089a-b are electrically connected to the primary connector carrier 85 (e.g., via connection to one or more sockets in the primary connector carrier 85). The secondary connector assemblies 1089a-b can be mounted to the base plate 1084 or to some other structure of the kiosk 1010, as discussed in detail with respect to FIG. 20.

Figure 17:
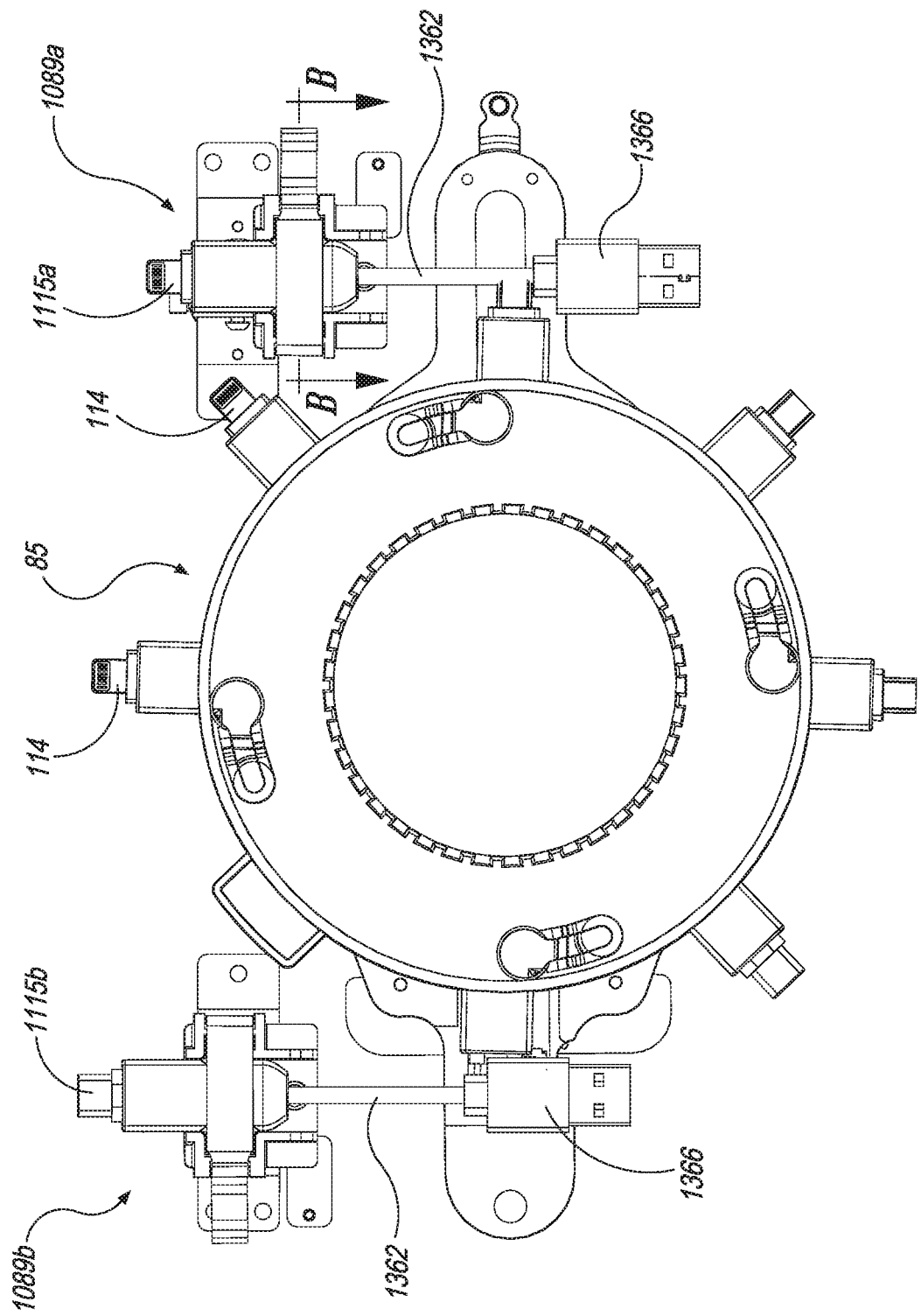
FIG. 17 is a view of connector assemblies of the DES of FIG. 15A along an axis of rotation of the primary connector assembly.

FIG. 17 is a front view of the primary connector carrier 85 and the secondary connector assemblies 1089a-b, as observed parallel to an axis of rotation of the connector carrier 85. The first secondary connector assembly 1089a is illustrated in a lowered or retracted position, while the second secondary connector assembly 1089b is illustrated in a raised or extended position. Retraction and extension of the secondary connector assemblies 1089a-b can be controlled in response to user input (e.g., via a touch screen portion of one of the displays 1016*a-b*, and/or via one of the user interface devices 1014*a-d*) identifying a foldable phone to be evaluated. The secondary connectors 1115*a-b* may be necessary for foldable phones, as the data/charging ports on many foldable phones are positioned at or near the center of one segment of the phone (e.g., on one half or one third of the foldable phone). Such port positioning puts the port at an off-center portion of the foldable phone when the foldable phone is unfolded. In some embodiments, retraction and extension of the secondary connector assemblies 1089*a-b* is controlled in response to visual inspection and identification of a foldable phone within the kiosk (e.g., via one or more of the cameras within the kiosk). For example, visual inspection of an electronic device may reveal connection ports in offset positions, folding features, and/or other indicators that the electronic device is a foldable phone.

Figure 18A:
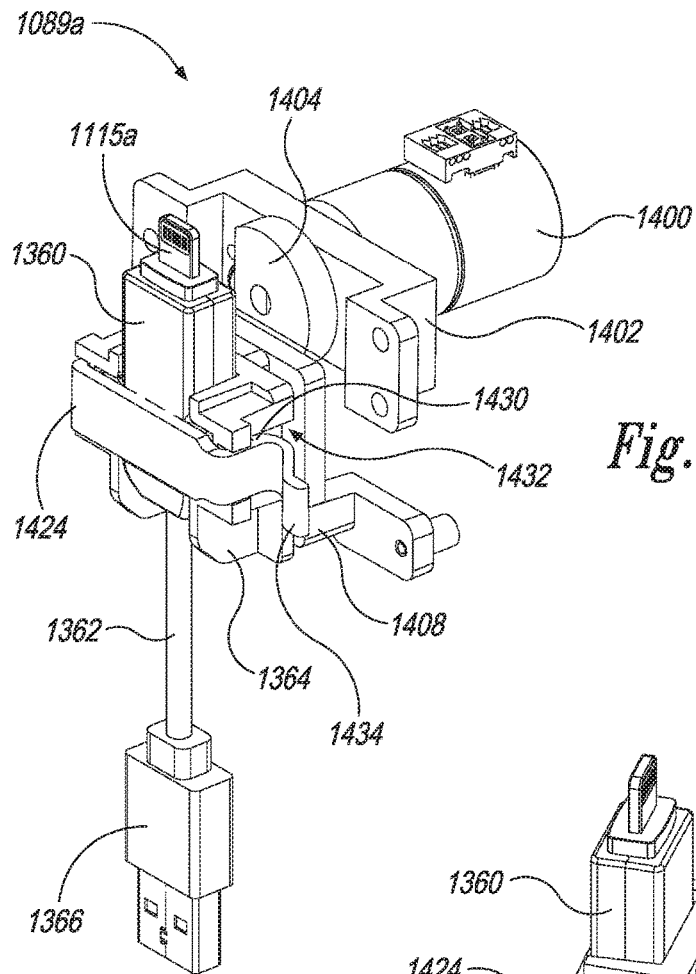
FIG. 18A is a front isometric view of a secondary connector assembly of the DES of FIG. 15A.
Figure 18B:
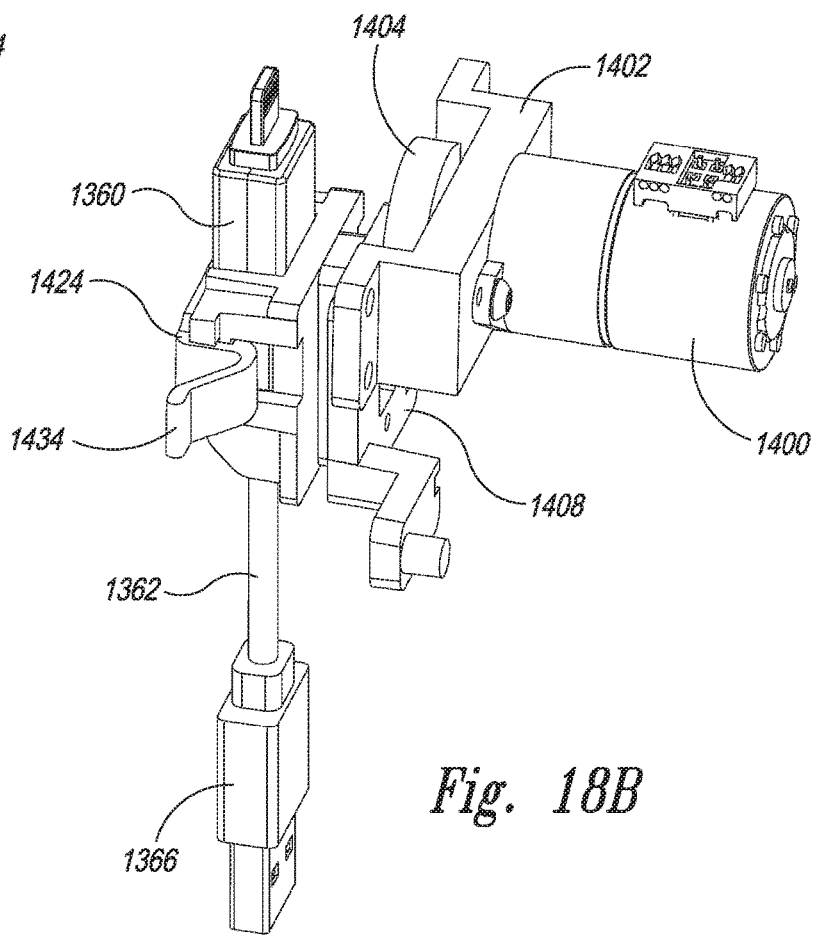
FIG. 18B is a rear isometric view of the secondary connector assembly of FIG. 18A.
Figure 19A:
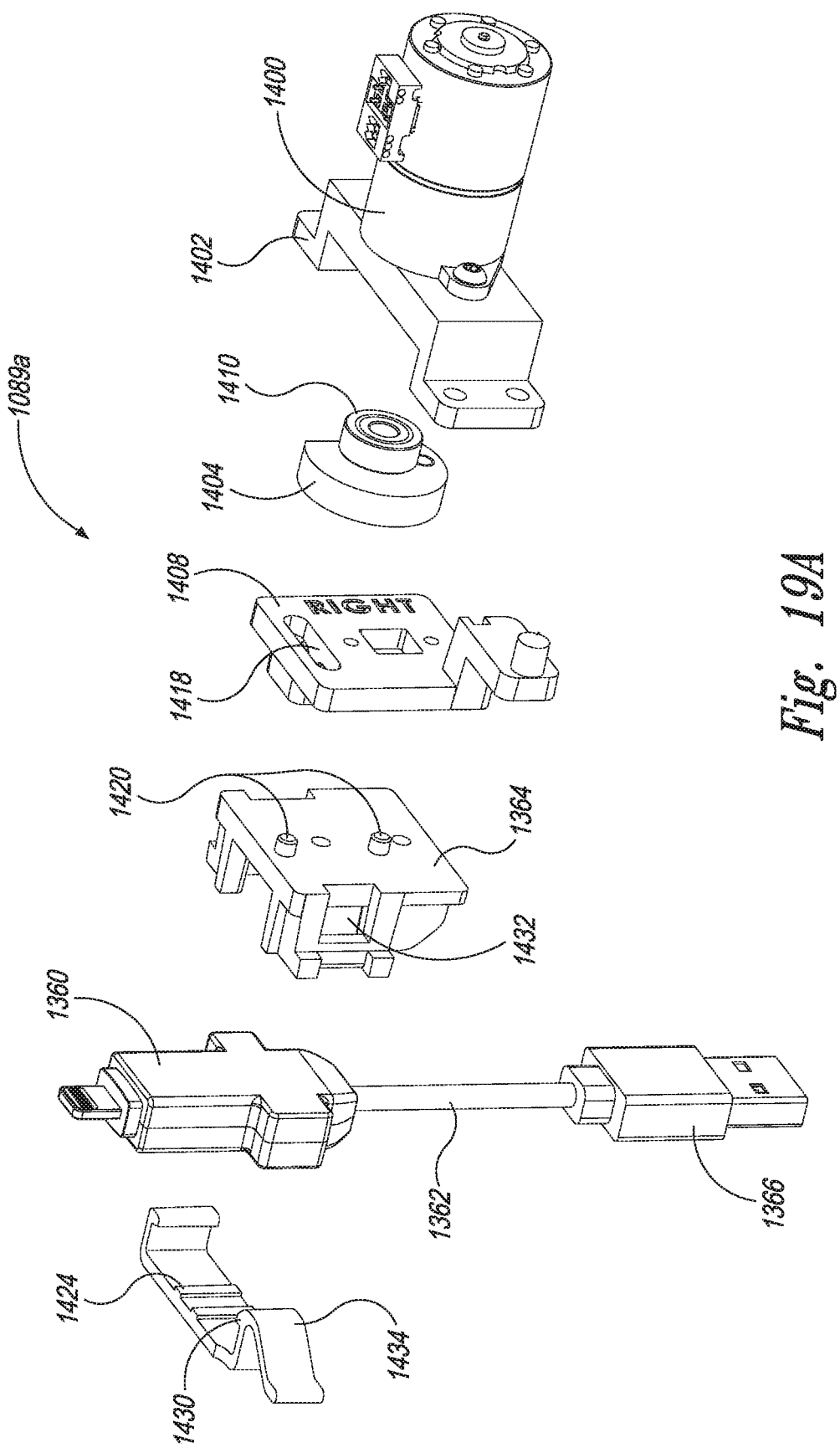
FIG. 19A is a rear exploded view of the secondary connector assembly of FIG. 18A.
Figure 19B:
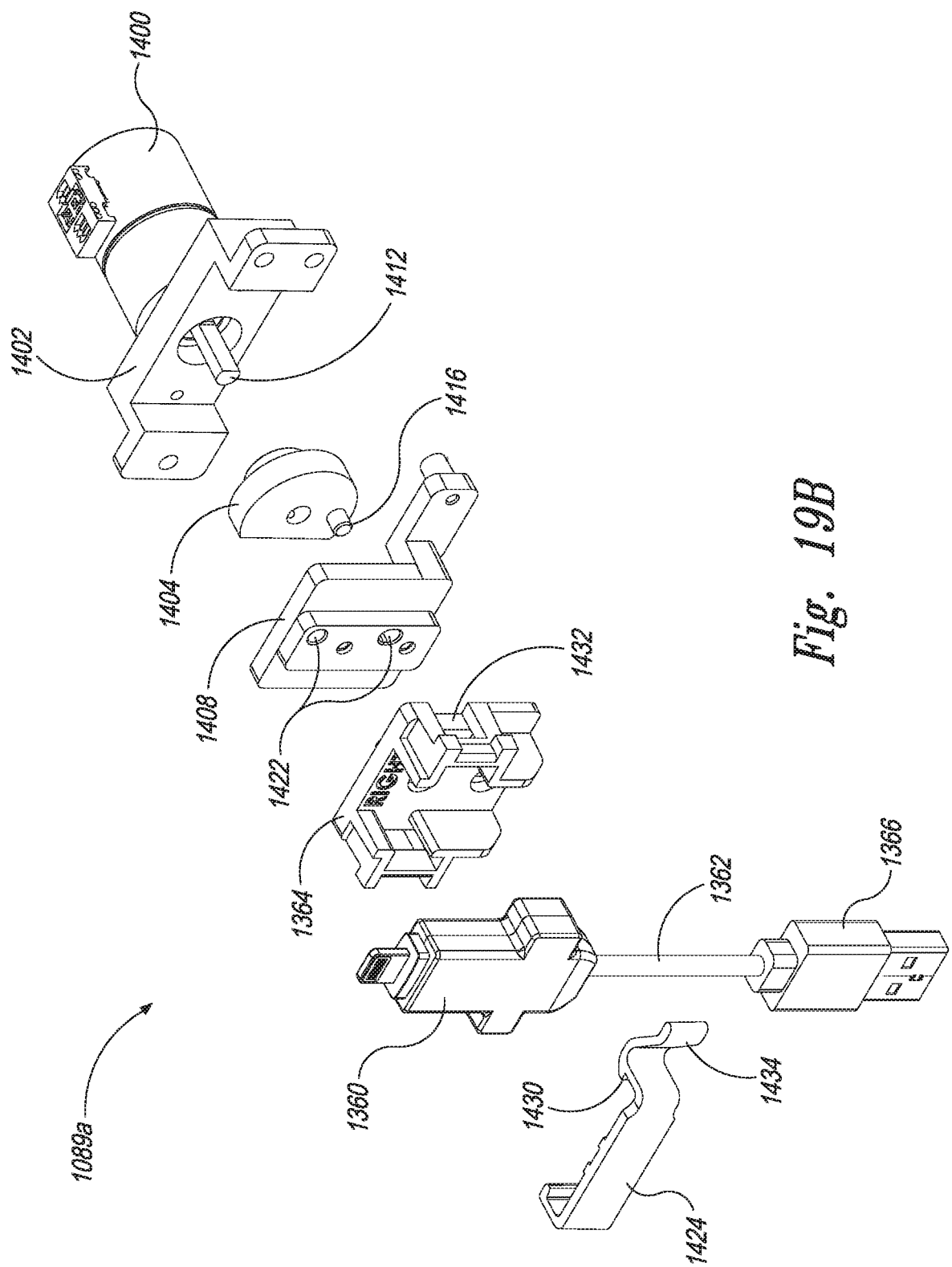
FIG. 19B is a front exploded view of the secondary connector assembly of FIG. 18A.

FIGS. 18A-18B are isometric views of the secondary connector assembly 1089*a*, while FIGS. 19A-19*b* are exploded views thereof. As illustrated, the secondary connector assembly 1089*a* includes a connector 1115*a*, a connector holder 1360, an electrical cable 1362, and a base connector 1366 (e.g., a universal cable connector, such as a USB connector). The electrical cable 1362 the first end portion electrically connected to the connector 1115*a* and a second portion electrically connected to the base connector 1366. To hold (e.g., fixedly hold) the phone connector 1115*a* in its proper position relative to the shelf member 1110, the connector 1115*a* is received in a corresponding connector holder 1360, which in turn is held in a corresponding retaining bracket 1364. The connector holder 1360 can include asymmetric protrusions on either side thereof and/or other dimensional features to ensure that the holder 1360 is positioned in the corresponding retaining brackets 1364 in the correct orientation (e.g., with the tip of the connector 1115*a* pointing upward). The base connector 1366 is operably received in a corresponding connector socket within the kiosk 1010.

The secondary connector assembly 1089*a* can have a drive assembly including a motor 1400 (e.g., an electric motor), a motor frame 1402, a cam drive 1404, and a driven bracket 1408. The motor 1400 can be mounted within the kiosk 1010 via the motor frame 1402. For example, the motor frame 1402 can be fastened or otherwise connected to the base plate 1084 or some other component of the kiosk 1010. The motor 1400 can be configured to drive rotation of the cam drive 1404. The cam drive 1404, in turn, can be configured to drive movement of the driven bracket 1408 up and down. For example, the cam drive 1404 can include a cam coupling 1410 (FIG. 19A) configured to receive a driveshaft 1412 of the motor 1400. The cam drive 1404 can be configured to translate rotation of the driveshaft 1412 (FIG. 19B) into linear motion of the driven bracket 1408. More specifically, the cam drive 1404 can include the cam tab 1416 (FIG. 19B) configured to engage with a cam receiver 1418 (FIG. 19A) of the driven bracket 1408. The cam receiver 1418 can be, for example, a slot configured to receive the camp tab 1416.

The driven bracket 1408 can be coupled to the retaining bracket 1364 either directly or indirectly. Preferably, the retaining bracket 1364 and driven bracket 1408 are rotationally and translationally affixed to each other when assembled. For example, one or more fasteners, adhesives, or other coupling methods and structures can be used to couple the driven bracket 1408 the retaining bracket 1364. One or both of the driven bracket 1408 and the retaining bracket 1364 can include alignment features configured to maintain desired alignment between the driven bracket 1408 and retaining bracket 1364. Maintaining alignment between the driven bracket 1408 and the retaining bracket 1364 can reduce the likelihood of motion of the driven bracket 1408 in directions other than the desired extension and retraction directions. The alignment features can include one or more protrusions or indentations on one or both of the retaining bracket 1364 and the driven bracket 1408. For example, the retaining bracket 1364 can include one, two, or more protrusions 1420 (FIG. 19A) configured to engage one, two or more indentations 1422 (FIG. 19B) in the driven bracket 1408.

Returning to FIG. 18A, the connector holder 1360 can be coupled to the retaining bracket 1364 via one or more retaining mechanisms 1424. The retaining mechanism 1424 can be, for example, a clip or other structure configured to releasably engage with one or both of the connector holder 1360 and the retaining bracket 1564. The retaining mechanism 1424 can include a retaining tab 1430 configured to engage with the retaining slot 1432 in the connector holder 1360. The retaining mechanism 1424 can include a release mechanism 1434 configured to allow the user to quickly and easily release the retaining mechanism 1424 from the connector holder 1360. For example, the release mechanism 1434 can be a flange or other protrusion configured to be pulled or otherwise manipulated to release the retaining tab 1430 from the retaining slot 1432.

Figure 20:
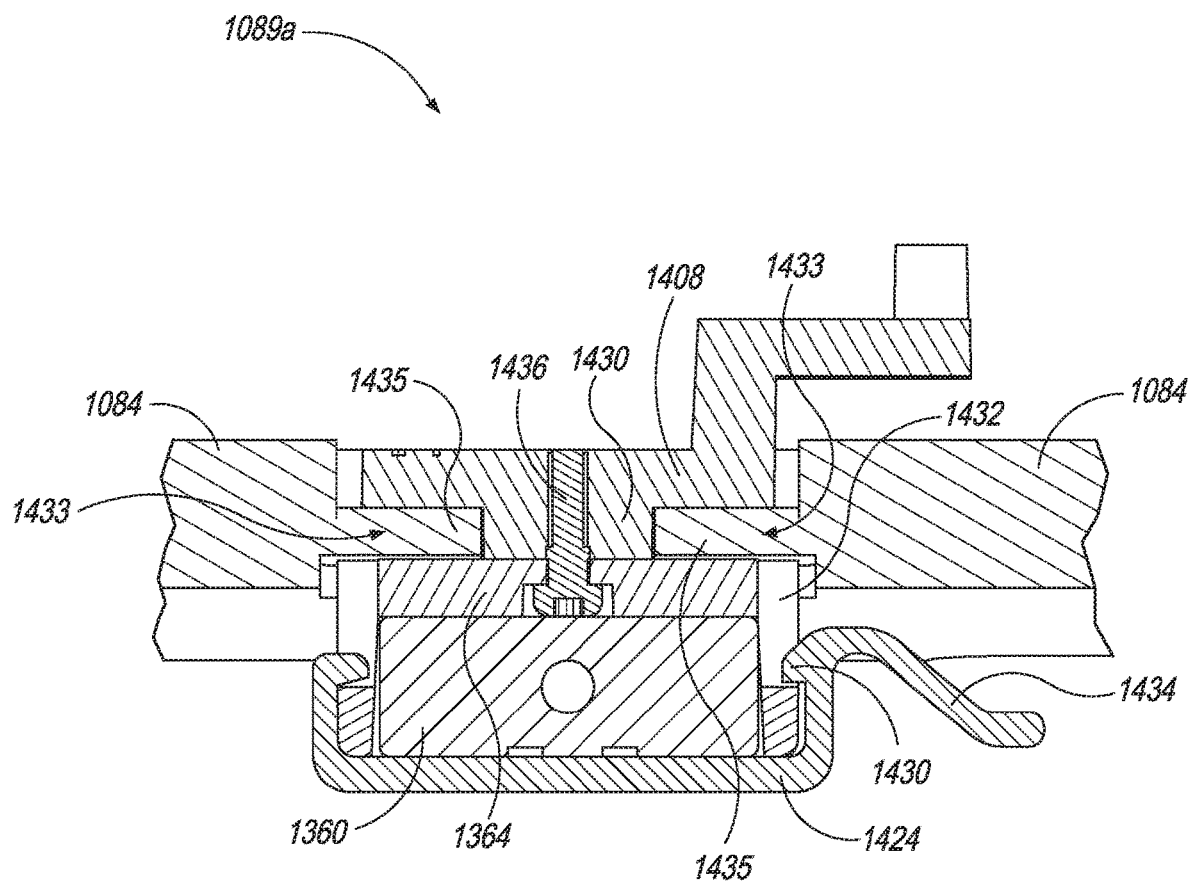
FIG. 20 is a cross-sectional top view of the secondary connector assembly of FIG. 18A taken along the cut-plane B-B of FIG. 17.

FIG. 20 is a cross-sectional view of the secondary connector assembly 1089*a* is taken along the cut plane 20-20 in FIG. 17. As discussed above, the secondary connector assembly 1089*a* can be mounted to the base plate 1084. More specifically, the retaining bracket 1364 and driven bracket 1408 can clamp onto or otherwise capture a portion of the base plate 1084. Connection between the retaining bracket 1364 and the driven bracket 1408 can be tight enough to reduce the risk of vibration between the connector assembly 1089*a* and the base plate 1084 while being loose enough to allow translational motion of the connector assembly 1089*a* with respect to the base plate 1084. For example, one or both of the driven bracket 1408 and the retaining bracket 1064 can include a spacing portion 1430 (e.g., a protrusion, or other structure extending between the driven bracket 1408 and the retaining bracket 1064) which spaces the driven bracket 1408 from the retaining bracket 1064. This spacing can form one or more channels 1433 or tracks in which retained portions 1435 of the base plate 1084 can be captured. The spacing portion 1430 can inhibit or prevent over tightening of the driven bracket 1408 and retaining bracket 1064 onto the retained portions 1435 of the base plate 1084. In some embodiments, one or more fasteners 1436 extend at least partially through the spacing portion 1430 to connect the driven bracket 1408 the retaining bracket 1064. The channels 1433 and retained portions 1435 can be configured to permit linear motion of the secondary connector assembly 1089*a* in the retraction and extension directions while preventing translation or rotation of the secondary connector assembly 1089*a* in other directions. While FIGS. 18A-20 illustrate and describe the components and features of the first secondary connector assembly 1089*a*, it should be noted that the second secondary connector assembly 1089*b* can be identical to or substantially identical to the first secondary connector assembly 1089*a* in both structure and function.

Figure 21:
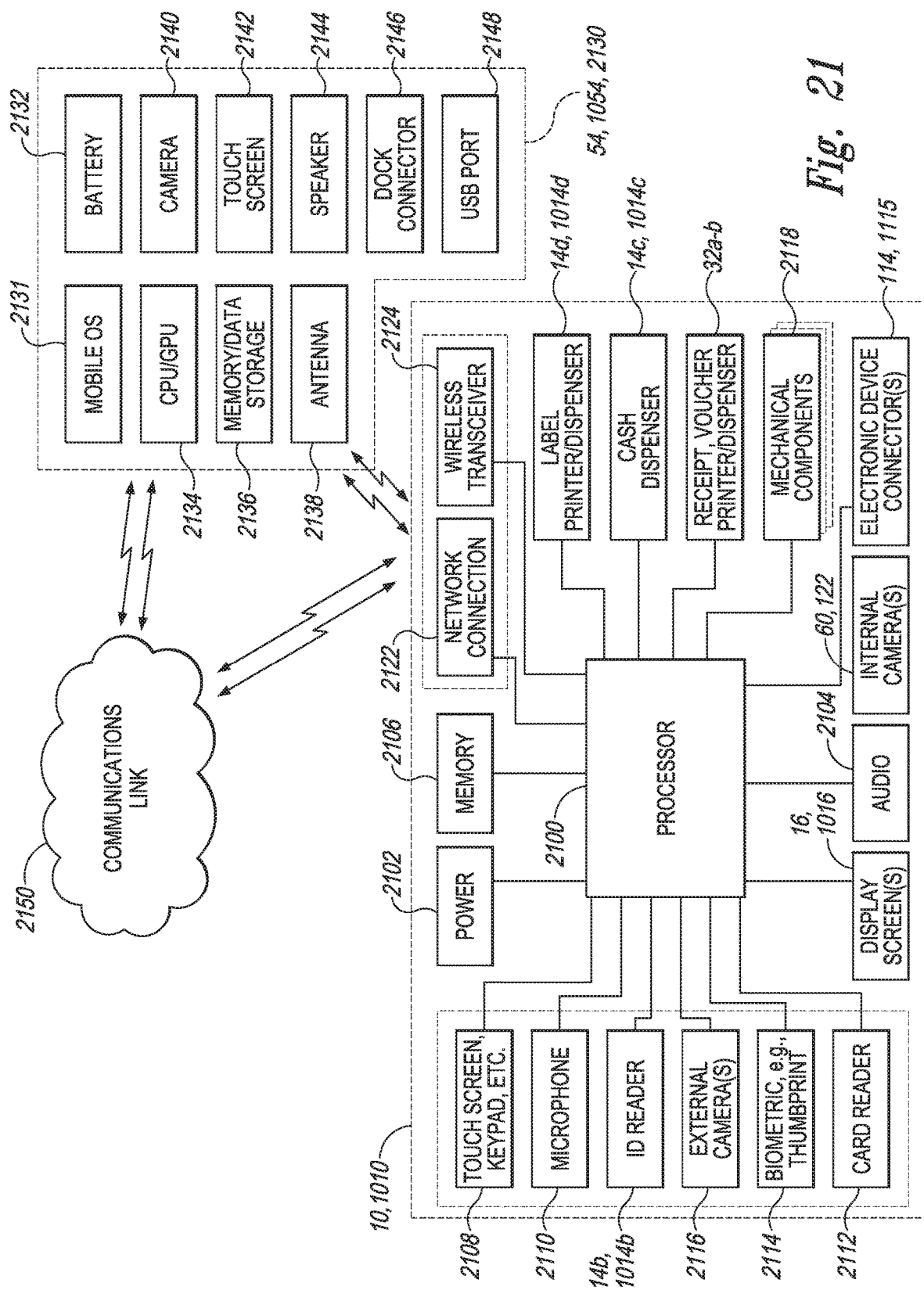
FIG. 21 is a schematic diagram illustrating various components associated with the kiosks of FIGS. 1-6 and 14A-14B.

FIG. 21 provides a schematic representation of an architecture of the kiosk 10, 1010 configured in accordance with embodiments of the present technology. In the illustrated embodiment, the kiosk 10, 1010 includes a suitable processor or central processing unit (CPU) 2100 that controls operation of the kiosk 10, 1010 in accordance with computer-readable instructions stored on system memory 2106. The CPU 2100 may be any logic processing unit, such as one or more CPUs, digital signal processors (DSPs), application-specific integrated circuits (ASICs), etc. The CPU 2100 may be a single processing unit or multiple processing units in a device or distributed across multiple devices. The CPU 2100 is connected to the memory 2106 and may be coupled to other hardware devices, for example, with the use of a bus (e.g., a PCI Express or Serial ATA bus). The CPU 2100 can include, by way of example, a standard personal computer (PC) (e.g., a DELL OPTIPLEX 7010 PC) or other type of embedded computer running any suitable operating system, such as Windows, Linux, Android, iOS, or an embedded real-time operating system. In some embodiments, the CPU 2100 can be a small form factor PC with integrated hard disk drive (HDD) or solid-state drive (SSD) and universal serial bus (USB) or other ports to communicate with the other components of the kiosk 10, 1010. In other embodiments, the CPU 2100 can include a microprocessor with a stand-alone motherboard that interfaces with a separate HDD. The memory 2106 can include read-only memory (ROM) and random access memory (RAM) or other storage devices, such as disk drives or SSDs, that store the executable applications, test software, databases and other software required to, for example, control kiosk components, process electronic device information and data (to, e.g., evaluate device make, model, condition, pricing, etc.), communicate and exchange data and information with remote computers and other devices, etc.

The CPU 2100 can provide information and instructions to kiosk users via the display screen 16, 1016 and/or an audio system (e.g., a speaker) 2104. The CPU 2100 can also receive user inputs via, e.g., a touch screen 2108 associated with the display screen 16, 1016, a keypad with physical keys, and/or a microphone 2110. Additionally, the CPU 2100 can receive personal identification and/or biometric information associated with users via the ID reader 14b, 1014b, one or more external cameras 2116, and/or a fingerprint reader 2114. In some embodiments, the CPU 2100 can also receive information (such as user identification and/or account information) via a card reader 2112 (e.g., a debit, credit, or loyalty card reader having, e.g., a suitable magnetic stripe reader, optical reader, etc.). The CPU 2100 can also control operation of the label dispenser 110 and systems for providing remuneration to users, such as the payment dispenser 14c, 1014c and/or a receipt or voucher printer 32a-b and an associated dispenser 14d, 1014d.

As noted above, the kiosk 10, 1010 additionally includes a number of electronic, optical and electromechanical devices for electrically, visually and/or physically analyzing electronic devices placed therein for recycling. Such systems can include one more internal cameras 60, 122 for visually inspecting electronic devices for, e.g., determining external dimensions and condition, and one or more of the electrical connectors 114, 1115 (e.g., USB connectors) for, e.g., powering up electronic devices and performing electronic analyses. As noted above, the cameras 60, 122 can be operably coupled to the upper and lower chambers 40, 1040 and 120, and one or more of the connectors 114, 1115 can be movably and interchangeably carried by the connector assemblies 85, 1089. The kiosk 10, 1010 further includes a plurality of mechanical components that are electronically actuated for carrying out the various functions of the kiosk 10, 1010 during operation. The mechanical components 2118 can include, for example, the inspection area access door 18, 1018 and one or more of the movable components (e.g. the inspection plate 100, 1100, the upper and lower chambers 40, 1040 and 120, etc.) operably associated with the inspection area 50, 1050. The kiosk 10, 1010 further includes power 2102, which can include battery power and/or facility power for operation of the various electrical components associated with kiosk operation.

In the illustrated embodiment, the kiosk 10, 1010 further includes a network connection 2122 (e.g., a wired connection, such as an Ethernet port, cable modem, FireWire cable, Lightning connector, USB port, etc.) suitable for communication with, e.g., all manner of remote processing devices via a communication link 2150, and a wireless transceiver 2124 (e.g., including a Wi-Fi access point, Bluetooth transceiver, near-field communication (NFC) device, and/or a wireless modem or cellular radio utilizing GSM, CDMA, 3G, 4G and/or 5G technologies, each of which may include an associated antenna or antennas) for data communications suitable for communication with, e.g., all manner of remote processing devices via the communication link 2150 and/or directly via, e.g., a wireless peer-to-peer connection. For example, the wireless transceiver 2124 can facilitate wireless communication with handheld devices, such as a mobile device 54, 1054, 2130 (e.g., a smartphone) either in the proximity of the kiosk 10, 1010 or remote therefrom. By way of example only, in the illustrated embodiment the mobile device 54, 1054, 2130 can include one or more features, applications and/or other elements commonly found in smartphones and other known mobile devices. For example, the mobile device 54, 1054, 2130 can include a CPU and/or a graphics processing unit (GPU) 2134 for executing computer readable instructions stored on memory 2136. In addition, the mobile device 54, 1054 can include an internal power source or battery 2132, a dock connector 2146, a USB port or other connection port 2148, a camera 2140, and/or well-known input devices, including, for example, a touch screen 2142, a keypad, etc. In many embodiments, the mobile device 54, 1054 can also include a speaker 2144 for two-way communication and audio playback. In addition to the foregoing features, the mobile device 54, 1054 can include a mobile operating system (OS) 2131 and/or a device wireless transceiver that may include one or more antennas 2138 for wirelessly communicating with, for example, other mobile devices, websites, and the kiosk 10, 1010. Such communication can be performed via, e.g., the communication link 2150 (which can include the Internet, a public or private intranet, a local or extended Wi-Fi network, cell towers, the plain old telephone system (POTS), etc.), direct wireless communication, etc.

Unless described otherwise, the construction and operation of the various components shown in FIG. 21 are of conventional design. As a result, such components need not be described in further detail herein, as they will be readily understood by those skilled in the relevant art. In other embodiments, the kiosk 10, 1010 and/or the mobile device 54, 1054 can include other features that may be different from those described above. In still further embodiments, the kiosk 10, 1010 and/or the mobile device 54, 1054 can include more or fewer features similar to those described above.

Figure 22A:
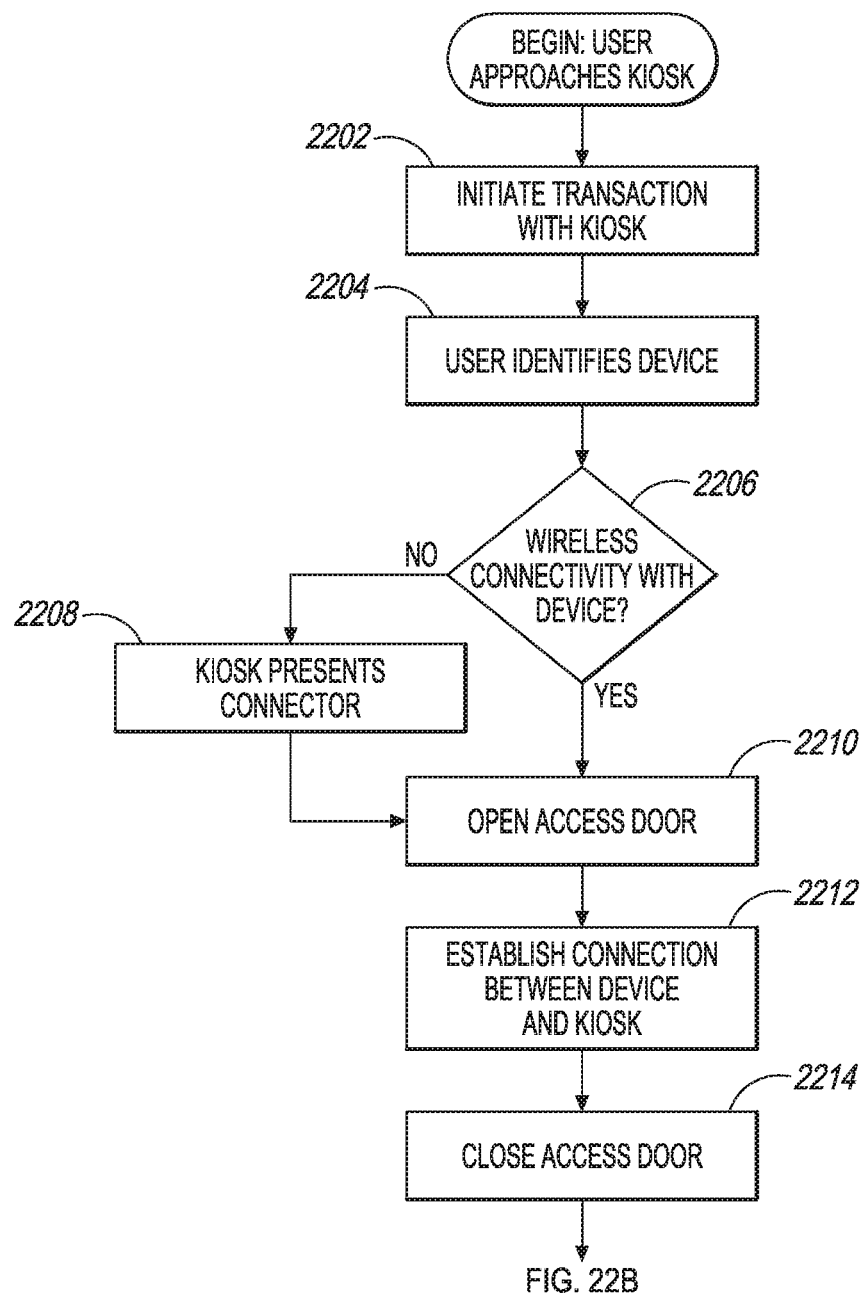
FIGS. 22A and 22B illustrate a flow routing for evaluating and purchasing an electronic device from a user in accordance with embodiments of the present technology.
Figure 22B:
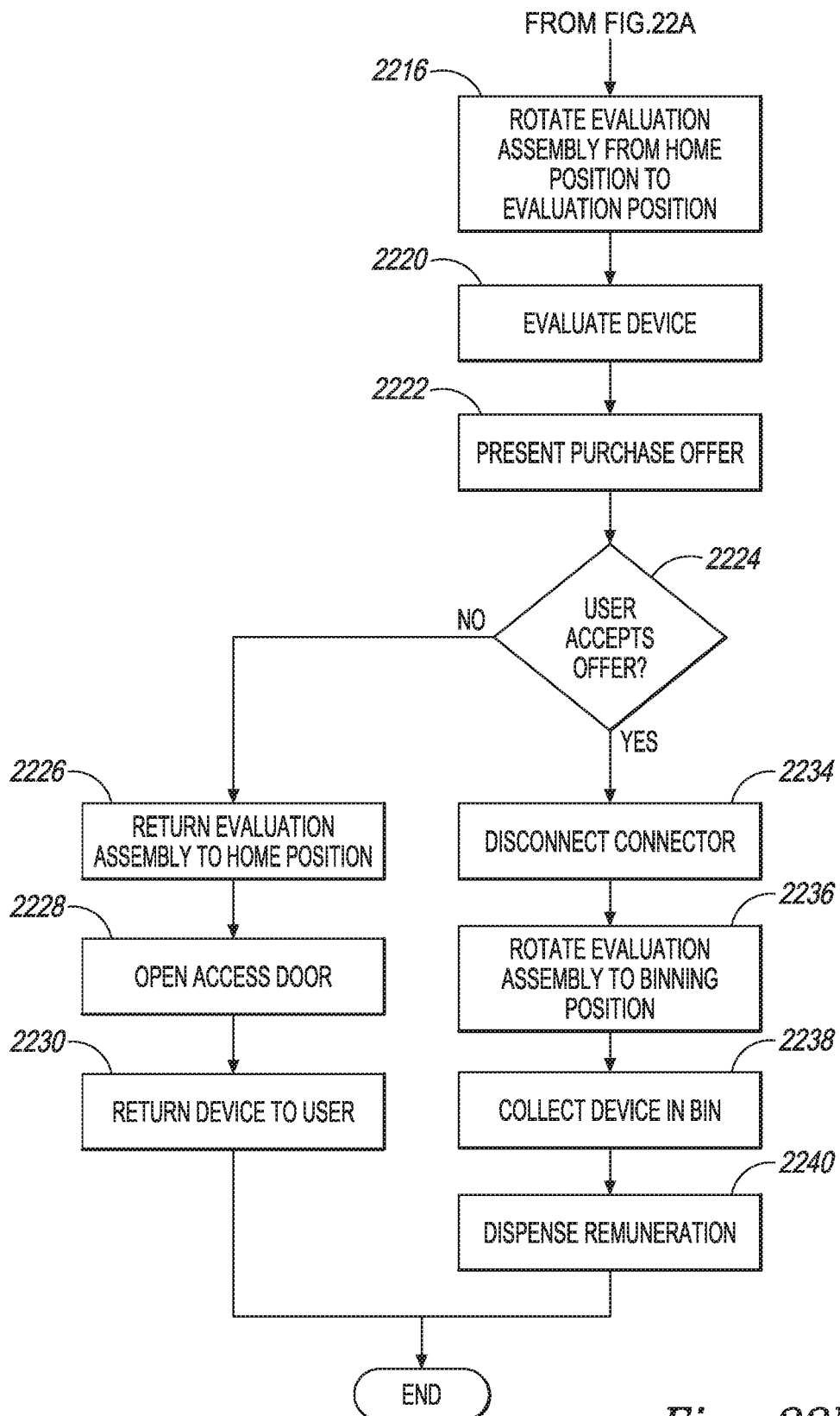

FIGS. 22A and 22B are flow diagrams of a routine 2200 for operating the kiosk 10, 1010 in accordance with embodiments of the present technology. In some embodiments, all or portions of the routine 2200 can be performed by the processor 2100 described above with reference to FIG. 21, in accordance with computer-readable instructions stored on the memory 2106. Referring first to FIG. 22A, the routine begins when the user approaches the kiosk 10, 1010. The routine 2200 then proceeds to block 2202 wherein the user to initiate the transaction with the kiosk 10, 1010. For example, the user may approach the kiosk 10, 1010 and indicate (via, e.g., interactions with the display 16, 1016) that the user wishes to sell an electronic device that the user currently owns (e.g., a mobile phone).

After the transaction is initiated, the routine 2200 proceeds to block 2204 wherein the user may identify the type of electronic device they wish to be evaluated (e.g., via a touch screen portion of one of the displays 16a-b,1016a-b and/or via one of the user interface devices 14a-d,1014a-d). In decision block 2206, the routine 2200 determines whether the electronic device is wirelessly connected to the kiosk 10, 1010. For example, confirming wireless connection can include receiving user input to the kiosk via the electronic device, wirelessly sending a confirmation code to the electronic device from the kiosk for entry by the user on one of the displays 16a-b,1016a-b or user inputs 14a-b,1014a-b, and/or some other confirmation method known in the art. If so, the routine proceeds to block 2210 wherein the access door the kiosk is opened to provide access to the inspection area of the kiosk. If no wireless connection exists between the electronic device and the kiosk 10, 1010, the routine proceeds to block 2208 wherein an appropriate electrical connector (e.g., a connector configured to connect to a docking port, data port, charging port, and/or some other port of the electronic device) is presented. Determining the appropriate electrical connector can be accomplished by receiving user input (e.g., via a touch screen portion of one of the displays 16a-b,1016a-d, and/or via one of the user interface devices 14a-d,1014a-d) identifying the make/model of the electronic device. In some embodiments, the user may be asked (e.g., via one of the displays 16a-d, 1016a-d) to select the type of electrical connector appropriate for the electronic device. In some embodiments, the electrical connector is presented after the access door is opened. In some embodiments, even in the presence of a wireless connection between the electronic device and the kiosk 10, 1010, the kiosk presents a wired electrical connector to the user. Presentation of the connector can include, for example, rotation of the primary connector carrier 85 and/or extension of one of the secondary connectors 1115.

In some embodiments, after the access door is opened, the user will be instructed (e.g., via one of the displays 16a-b, 1016a-b) to connect the electronic device to the kiosk, if such a connection is not already established. Once the electronic device is connected to the kiosk, the routine 2200 can proceed to block 2214 wherein the access door is closed. The access doors also locked to prevent the user or other persons from accessing the electronic device during inspection and from accessing the interior of the kiosk 10, 1010.

As illustrated in FIG. 22B, the routine 2200 can proceed to block 2216, wherein the evaluation assembly of the kiosk is rotated from the home position (FIG. 11A) to an evaluation position (FIG. 11B). In some embodiments, the electrical connector is disconnected from the electronic device before or when the evaluation assembly is in the evaluation position. The routine 2000 can proceed to block 2221 evaluation assembly is in the evaluation position. At block 2220, the electronic device is evaluated. Evaluation of the device includes evaluation of the physical condition of the device (e.g., detecting damage or other wear), confirmation of the type of device (e.g., make and model), and/or evaluation of the functional condition of the device (e.g., battery charge, wireless capability, screen functionality, etc.). These evaluations can be accomplished via visual inspection and/or electrical inspection of the device within the kiosk 10, 1010. In some embodiments, a visual inspection is performed by remote personnel observing the electronic device via the one or more cameras of the kiosk. In some embodiments, visual inspection is performed, at least in part, via a neural network applying machine learning, as described in U.S. Provisional Patent Application No. 62/807,165, entitled NEURAL NETWORK BASED PHYSICAL CONDITION EVALUATION OF ELECTRONIC DEVICES, AND ASSOCIATED SYSTEMS AND METHODS and filed Feb. 18, 2019, the entire disclosure of which is incorporated by reference herein and made part of the present disclosure. Device evaluation can also include determining a purchase offer for the electronic device. In some instances, purchase offer is a cash offer or equivalent. In other instances, the purchase offer may be for trade-in credit, retail credit, or some other non-cash compensation. Depending on the condition of the device, the offer may be for recycling-only, without financial remuneration.

After evaluation and valuation of the electronic device, the routine 2200 can proceed to block 2222 wherein the offer is presented to the user. The routine then proceeds to decision block 2224 wherein the user either accepts the offer or rejects the offer. Should the user reject the offer, the routine 2200 proceeds to block 2226 wherein the evaluation assembly is returned to the home position. In block 2228 the access door is opened. Finally, a block 2230, the electronic device is returned to the user via the access door.

If, however, the user accepts the offer, the routine proceeds to block 2234 to disconnect the electrical connector from the electronic device (if such disconnection did not already occur). The routine 2200 then proceeds to block 2236 wherein the evaluation assembly is further rotated to a binning position (FIG. 11C). In the bidding position, the inspection plate and/or other components of the evaluation assembly are oriented to cause the electronic device to move from the evaluation assembly to a bin (block 2238) or other receptacle. The bin can be positioned within the kiosk 10, 1010 or adjacent the kiosk 10, 1010. Preferably, the bin is secured via one or more locks or other mechanisms configured to inhibit or prevent access to the electronic device is within the bin by unauthorized persons. The access door of the kiosk 10, 1010 can remain closed and locked during one or more of blocks 2234-2240.

In some embodiments, the routine include block 2240, in which remuneration determined in block 2222 is provided to the user. Remuneration can be dispensed by the kiosk payment dispenser 14c,1014c, directly deposited into a user's account, or otherwise provided to the user. In some embodiments, remuneration is delayed until receipt and inspection of the electronic device at a remote evaluation facility.

Figure 23:
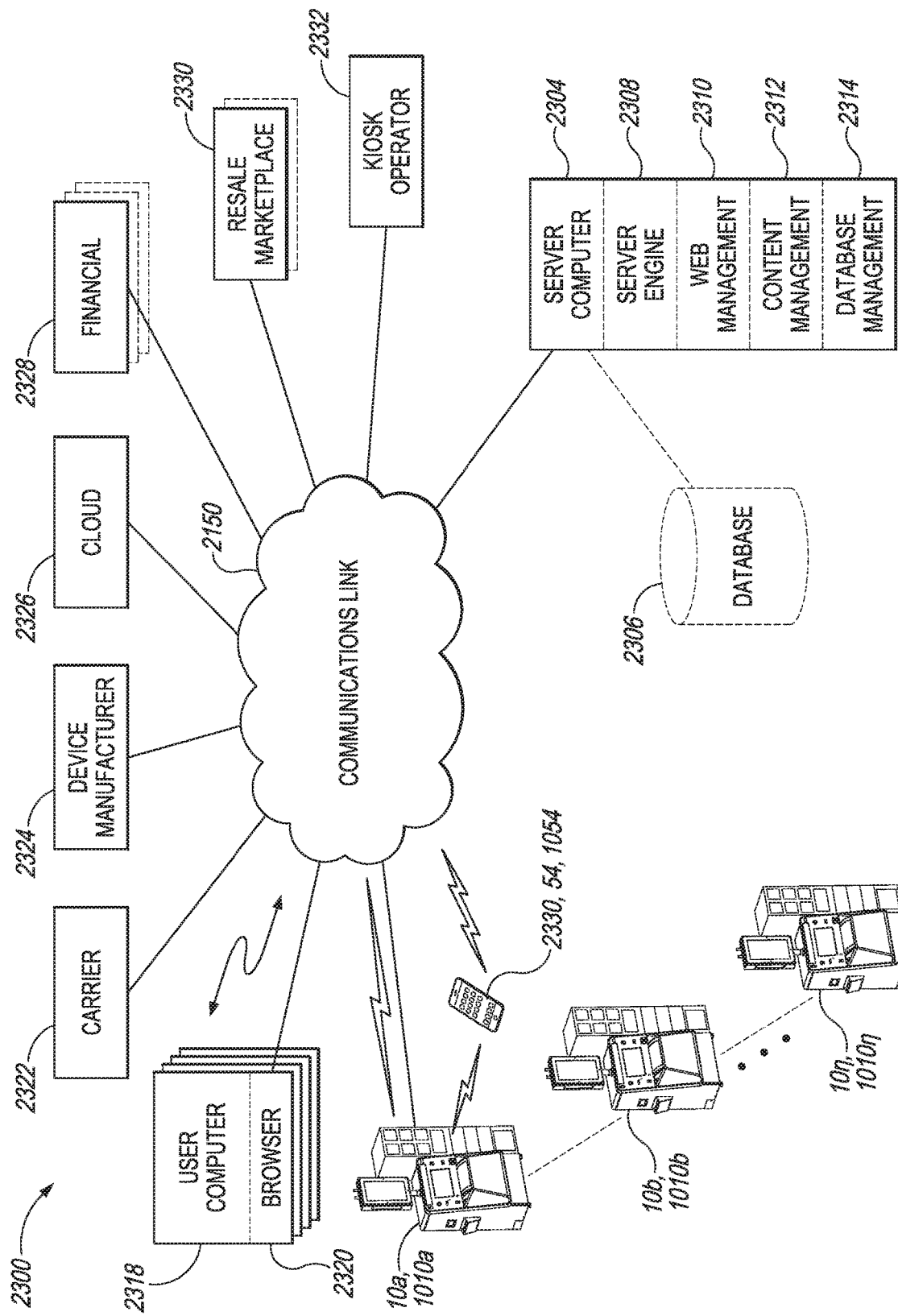
FIG. 23 is a schematic diagram of a suitable distributed computing environment for implementing various aspects of the present technology.

FIG. 23 is a schematic diagram of a suitable network environment for implementing various aspects of an electronic device recycling system 2300 configured in accordance with embodiments of the present technology. In the illustrated embodiment, a plurality of the kiosks 10, 1010 (identified individually as kiosks 100a,1010a-10n,1010n) can exchange information with one or more remote computers (e.g., one or more server computers 2304) via the communication link 2150. Although the communication link 2150 can include a publicly available network (e.g., the Internet with a web interface), a private communication link, such as an intranet or other network can also be used. Moreover, in various embodiments the individual kiosks 10, 1010 can be connected to a host computer (not shown) that facilitates the exchange of information between the kiosks 10, 1010 and remote computers, other kiosks, mobile devices, etc.

The server computer 2304 can perform many or all of the functions for receiving, routing and storing of electronic messages, such as webpages, audio signals and electronic images necessary to implement the various electronic transactions described herein. For example, the server computer 2304 can retrieve and exchange web pages and other content with an associated database or databases 2306. In some embodiments, the database 2306 can include information related to mobile phones and/or other consumer electronic devices. Such information can include, for example, make, model, serial number, International Mobile Equipment Identity (IMEI) number, carrier plan information, pricing information, owner information, etc. In various embodiments the server computer 2304 can also include a server engine 2308, a web page management component 2310, a content management component 2312, and a database management component 2314. The server engine 2308 can perform the basic processing and operating system level tasks associated with the various technologies described herein. The webpage management component 2310 can handle creation and/or display and/or routing of web or other display pages. The content management component 2312 can handle many of the functions associated with the routines described herein. The database management component 2314 can perform various storage, retrieval and query tasks associated with the database 2306, and can store various information and data such as animation, graphics, visual and audio signals, etc.

In the illustrated embodiment, the kiosks 10, 1010 can also be operably connected to a plurality of other remote devices and systems via the communication link 2150. For example, the kiosks 10, 1010 can be operably connected to a plurality of user devices 2318 (e.g., personal computers, laptops, handheld devices, etc.) having associated browsers 2320. Similarly, as described above the kiosks 10, 1010 can each include wireless communication facilities for exchanging digital information with wireless-enabled electronic devices, such as the electronic device 730. The kiosks 10, 1010 and/or the server computer 2304 are also operably connectable to a series of remote computers for obtaining data and/or exchanging information with necessary service providers, financial institutions, device manufactures, authorities, government agencies, etc. For example, the kiosks 10, 1010 and the server computer 2304 can be operably connected to one or more cell carriers 2322, one or more device manufacturers 2324 (e.g., mobile phone manufacturers), one or more electronic payment or financial institutions 2328, one or more databases (e.g., the GSMA IMEI Database, etc.), and one or more computers and/or other remotely located or shared resources associated with cloud computing 2326. The financial institutions 2328 can include all manner of entity associated with conducting financial transactions, including banks, credit/debit card facilities, online commerce facilities, online payment systems, virtual cash systems, money transfer systems, etc.

In addition to the foregoing, the kiosks 10, 1010 and the server computer 2304 can also be operably connected to a resale marketplace 2330 and a kiosk operator 2332. The resale marketplace 2330 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 2332 can be a central computer or system of computers for controlling all manner of operation of the network of kiosks 10, 1010. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 2332 can further include one or more display screens operably connected to cameras located at each of the kiosks 10, 1010 (e.g., one or more of the cameras 60, 122 described above). This remote viewing capability enables operator personnel to verify user identification and/or make other visual observations in real-time during transactions.

The foregoing description of the electronic device recycling system 2300 illustrates but one possible network system suitable for implementing the various technologies described herein. Accordingly, those of ordinary skill in the art with appreciate that other systems consistent with the present technology can omit one or more of the facilities described in reference to FIG. 23, or can include one or more additional facilities not described in detail in FIG. 23.

The kiosks 10, 1010, mobile devices 2330, 54, and 1054, server computers 2304, user computers or devices 2318, etc. can include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computers can include other program modules such as an operating system, one or more application programs (e.g., word processing or spreadsheet applications), and the like. The computers can include wireless computers, such as mobile phones, personal digital assistants (PDAs), palm-top computers, tablet computers, notebook and laptop computers desktop computers, e-readers, music players, GPS devices, wearable computers such as smartwatches and Google® Glass™, etc., that communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet can likewise be used herein. The network can have a client-server architecture, in which a computer is dedicated to serving other client computers, or it can have other architectures such as peer-to-peer, in which one or more computers serve simultaneously as servers and clients. A database or databases, coupled to the server computer(s), stores much of the web pages and content exchanged between the user computers. The server computer(s), including the database(s), can employ security measures to inhibit malicious attacks on the system, and to preserve integrity of the messages and data stored therein (e.g., firewall systems, message encryption and/or authentication (e.g., using transport layer security (TLS) or secure sockets layer (SSL)), password protection schemes, encryption of stored data (e.g., using trusted computing hardware), and the like).

One skilled in the relevant art will appreciate that the concepts of the invention can be used in various environments other than location based or the Internet. In general, a display description can be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, can be used instead of the Internet. The system can be conducted within a single computer environment, rather than a client/server environment. Also, the user computers can comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the inventions can be embodied in a special purpose computer or data processor that is specifically programmed, configured, or constructed to perform one or more of the computer-executable instructions described in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Those of ordinary skill in the art will appreciate that the routines and other functions and methods described herein can be implemented as an application specific integrated circuit (ASIC), by a digital signal processing (DSP) integrated circuit, through conventional programmed logic arrays and/or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Although specific circuitry is described above, those or ordinary skill in the art will recognize that a microprocessor-based system could also be used where any logical decisions are configured in software.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A consumer operated kiosk configured to evaluate an electronic device received from a user, the kiosk comprising:
    a housing;
    an inspection plate rotatable relative to the housing between a first position and a second position, wherein the inspection plate is configured to receive the electronic device when the inspection plate is in the first position;
    a camera having a field of view including at least a portion of the inspection plate;
    a wired and/or wireless connectivity device configured to connect to the electronic device; and
    one or more processors operably connected to the wired and/or wireless connectivity device, the camera, and the inspection plate, wherein the one or more processors are configured to:
        receive characteristic information about the electronic device via the wired and/or wireless connectivity device;
        cause the inspection plate to rotate from the first position to the second position with the electronic device thereon;
        receive one or more images of the electronic device via the camera when the inspection plate is in the second position; and
        facilitate determination of an offer price for the electronic device based at least in part on the characteristic information and the one or more images.

2. The kiosk of claim 1 wherein the inspection plate is configured to rotate from the second position to a third position to move the electronic device from the inspection plate to a storage receptacle.

3. The kiosk of claim 1, further comprising one or more mirrors positioned proximate the inspection plate when the inspection plate is in the second position, the one or more mirrors configured to provide the camera with one or more reflected views of the electronic device positioned on the inspection plate.

4. The kiosk of claim 3 wherein the one or more mirrors are mounted to a mirror frame configured to rotate relative to the inspection plate.

5. The kiosk of claim 1 wherein the camera is a first camera, and wherein the kiosk further comprises a second camera having a field of view including at least a portion of the inspection plate.

6. The kiosk of claim 5, wherein the first camera is positioned above the inspection plate when the inspection plate is in the second position, and wherein the second camera is positioned below the inspection plate when the inspection plate is in the second position.

7. The kiosk of claim 1 wherein the wired and/or wireless connectivity device includes an electrical connector mounted to a rotatable hub.

8. The kiosk of claim 7 wherein the electrical connector is a first electrical connector, wherein the kiosk further comprises a second electrical connector spaced apart from the rotatable hub, wherein the second electrical connector is configured to translate between a retracted position and an extended position, and wherein the second electrical connector is configured to electrically connect to the electronic device when in the extended position.

9. The kiosk of claim 8, further comprising a third electrical connector spaced apart from the rotatable hub, wherein the second electrical connector is positioned to a first side of the rotatable hub, and the third electrical connector is positioned to a second side of the rotatable hub opposite the first side of the rotatable hub, wherein the third electrical connector is configured to translate between a retracted position and an extended position, and wherein the third electrical connector is configured to electrically connect to the electronic device when in the extended position.

10. The kiosk of claim 1, wherein the electronic device is a mobile phone.

11. The kiosk of claim 1, wherein the inspection plate is transparent.

* * * * *